(12) United States Patent
Gitis et al.

(10) Patent No.: US 6,494,765 B2
(45) Date of Patent: Dec. 17, 2002

(54) METHOD AND APPARATUS FOR CONTROLLED POLISHING

(75) Inventors: Norm Gitis, Cupertino, CA (US); Michael Vinogradov, Sunnyvale, CA (US)

(73) Assignee: Center for Tribology, Inc., Campbell, CA (US)

( * ) Notice: Subject to any disclaimer, the term of this patent is extended or adjusted under 35 U.S.C. 154(b) by 0 days.

(21) Appl. No.: 09/859,062

(22) Filed: May 17, 2001

(65) Prior Publication Data

US 2002/0037681 A1 Mar. 28, 2002

Related U.S. Application Data

(63) Continuation-in-part of application No. 09/669,214, filed on Sep. 25, 2000, now Pat. No. 6,257,953.

(51) Int. Cl.[7] .................................................. B24B 49/00
(52) U.S. Cl. ................................. 451/5; 451/8; 451/287
(58) Field of Search ........................... 451/5, 6, 8, 41, 451/56, 285, 286, 287, 288

(56) References Cited

U.S. PATENT DOCUMENTS

| | | |
|---|---|---|
| 5,036,015 A | 7/1991 | Sandhu et al. |
| 5,232,875 A | 8/1993 | Tuttle et al. |
| 5,234,867 A | 8/1993 | Schultz et al. |
| 5,597,341 A | 1/1997 | Kodera et al. |
| 5,599,423 A | 2/1997 | Parker et al. |
| 5,738,562 A | 4/1998 | Doan et al. |
| 5,899,800 A | 5/1999 | Shendon |
| 5,944,580 A * | 8/1999 | Kim et al. ...................... 451/9 |
| 5,948,205 A | 9/1999 | Kodera et al. |
| 5,948,700 A | 9/1999 | Zheng |
| 6,184,139 B1 | 2/2001 | Adams et al. |
| 6,213,846 B1 * | 4/2001 | Li et al. ......................... 451/6 |
| 6,257,953 B1 * | 7/2001 | Gitis et al. ..................... 451/5 |
| 6,306,008 B1 * | 10/2001 | Moore ............................ 451/5 |
| 6,352,466 B1 * | 3/2002 | Moore ............................ 451/5 |

* cited by examiner

*Primary Examiner*—George Nguyen

(57) ABSTRACT

An apparatus for controlling a polishing process, in particular for detecting an end point of the polishing process, comprising a rotating or orbiting platen with a pad, a rotating head that supports an object to be treated, e.g., a semiconductor wafer, and performs radial movements with respect to the platen, and a polishing process control system comprising a plurality of groups of various sensing devices for detecting an end point of the process. In the illustrated embodiment one group of the sensing devices is a group of high-frequency acoustic emission sensors built on various levels into components of the rotating head. Another group of sensing devices is represented by force/torque sensors connected with various elements of the rotating head and the platen, respectively, and intended for direct measurement of compression force and friction response (force or torque) between the head and the platen and a coefficient of friction between the wafer and the polishing pad. All groups of sensors work simultaneously and their measurement data is processed and analyzed by a control unit for obtaining accurate and reliable results.

45 Claims, 12 Drawing Sheets

METHOD AND APPARATUS FOR CONTROLLED POLISHING

CROSS-REFERENCES TO RELATED APPLICATIONS

The present patent application is a continuation-in-part of U.S. patent application Ser. No. 09/669,214 filed Sep. 25, 2000, now U.S. Pat. No. 6,257,953 for which a Notice of Allowance has been granted.

FIELD OF THE INVENTION

The present invention relates to the field of polishing, in particular to the field of chemical mechanical polishing. More particularly, the invention relates to methods and apparatus for controlling and optimizing chemical mechanical polishing processes and materials for polishing substrates used in the manufacture of semiconductor wafers and integrated circuits.

BACKGROUND OF THE INVENTION

Polishing processes play significant role in modern technologies, in particular in semiconductor fabrication. For example, at certain stages in the fabrication of devices on a substrate, it may become necessary to polish the surface of the substrate before further processing may be performed. In a polishing process, known as mechanical polishing, a polishing pad with abrasive particles repetitively passes over the surface of the substrate. Polishing may also be performed with a chemically active abrasive slurry. A polishing system that uses a chemical slurry is commonly known as a chemical mechanical polishing (CMP) system. In contrast with mechanical polishing, the slurry in a CMP system provides an increased removal rate of a substrate material. Additionally, by selecting particular chemicals, chemical slurry can be used to selectively polish certain films on a semiconductor substrate.

Chemical mechanical planarization, commonly referred to as CMP, may be used as a preparation step in the fabrication of substrates or semiconductor wafers to provide substantially planar front and back sides thereon. CMP is also used to remove high elevation features, or other discontinuities, which are created on the outermost surface of a wafer during the fabrication of microelectronic circuitry on the substrate.

The planarization method typically requires that the substrate be mounted in a wafer head or carrier, with the surface of the substrate to be polished exposed. The substrate supported by the head is then placed against a moving polishing pad mounted on a platen. The head holding the substrate may also rotate, to provide additional motion between the substrate and the polishing pad surface. Further, a polishing slurry (typically including an abrasive and at least one chemically reactive agent therein, which are selected to enhance the polishing of the topmost film layer of the substrate) is supplied to the pad to provide an abrasive chemical solution at the interface between the pad and the substrate. Pressure may be applied between the carrier and the platen to effectuate polishing. In some CMP machines the wafer rotates while the polishing pad is stationary, in others the pad moves while the wafer carrier is stationary, and in yet another type both the wafer carrier and the pad move simultaneously. The polishing pad may be pre-soaked and continually re-wet with a slurry that may have a variety of abrasive particles suspended in a solution of chemicals.

DESCRIPTION OF THE RELATED ART

U.S. Pat. No. 5,597,341 issued on Jan. 28,1997 to Kodera, et al, U.S. Pat. No. 5,234,867 issued on Aug. 10, 1993 to Schultz, et al., and U.S. Pat. No. 5,232,875 issued on Aug. 3, 1993 to Tuttle, et al illustrate several techniques and corresponding types of CMP systems for chemical mechanical planarization of the semiconductor wafer surfaces.

One type of CMP systems is shown schematically in FIG. 1a. In this system a polishing pad 10a is mounted on a platen 12a, which rotates by means of a first motor 14a through a transmission 16a. A wafer 20a with a front surface 22a to be polished is held on a head 24a. In the illustrated apparatus, the polishing pad 10a has a diameter significantly larger than that of the wafer 20a (FIG. 1a). The polishing head 24a is rotated by means of a second motor 26a through a transmission 28a and comprises a retaining ring 30a, which prevents the wafer from slipping out of the head during polishing. A slurry feeding system 32a pours a slurry on the top working surface of the pad 10a.

FIG. 1b illustrates another embodiment of the aforementioned known CMP system. In this embodiment, a polishing pad 10b is mounted on a platen 12b, which is rotated by means of a first motor 14b through a transmission 16b. A wafer 20b with a front surface 22b to be polished is held on a head 24b. In the illustrated apparatus, the polishing pad 10b has a diameter significantly smaller than that of the wafer 20b (FIG. 1b). The polishing head 24b is rotated by means of a second motor 26b through a transmission 28b and comprises a retaining ring 30b, which prevents the wafer from slipping out of the head during polishing. A slurry feeding system 32b pours a slurry on the front surface of the wafer 22b.

In order to provide uniformity of polishing, in the CMP systems of the types shown in FIGS. 1a and 1b, the distance between the polishing pad rotational axis and the wafer rotational axis is typically varied in an oscillatory manner. For this purpose, the substrate is repeatedly moved back and forth relative to the polishing pad. In FIGS. 1a and 1b the oscillatory movement is shown by arrows 25a and 25b, respectively.

Another type of the CMP system, shown schematically in FIG. 2, is disclosed, e.g., in U.S. Pat. No. 5,899,800, issued on May 4,1999 to Shendon and in U.S. Pat. No. 6,184,139, issued on Feb. 6, 2001 to Adams et al. In the CMP apparatuses of these patents, the lower head comprising a polishing pad 10c mounted on a platen 12c is driven into orbital movements by means of an orbital drive 34 with a motor 36, while the carrier 24c holding the wafer 20c rotates about the central axis $O_1$—$O_1$ by a motor 26c via a transmission 28c. The pad diameter is slightly larger than the diameter of the wafer 20c. A polishing fluid (slurry) is introduced to the wafer directly through the openings 38a, 38b, . . . 38n in the polishing pad 10c with point-of-use mix, which results in better wafer uniformity and reduced slurry consumption.

The efficiency of polishing greatly depends on the pad surface conditions and may reduce with time as polishing pad is worn out. Therefore in the course of polishing, the pad surface should be refreshed or "conditioned" after a period of use to provide for a more uniform polishing rate, from wafer to wafer, and to provide for better planarization uniformity across a single wafer. During the pad conditioning process, a pad conditioner arm with an abrasive lower surface is forced to come in contact with the pad upper surface while the pad rotates or oscillates and the conditioner arm moves back and forth on the polishing pad. While the operation of conditioning is an effective way of deterring the wear of the polishing pad, the pad requires replacement if its surface conditions are not recovered by conditioning.

Important characteristics of a planarization process in semiconductor wafer fabrication are a removal rate, uniformity, and end point detection (EPD). Removal rate is the rate of material removal from the surface of semiconductor wafer being polished. Preferably, the rate of removal should be such that any surface peaks are preferentially flattened and the resultant surface is as near perfectly planar as possible. Uniformity of the material removal over the entire wafer surface is critical in order to provide required flatness and to avoid over- or under-polished areas on the wafer. Detection of the end point (i.e. the moment when predefined degree of surface flatness or non-uniformity is attained and polishing process has to be terminated) is usually associated with polishing of wafers with multiple layers on the surface, when the uppermost layer has to be completely or partially removed to expose the next layer. It requires very accurate determination of transition from one layer to another.

There are several factors that may affect all the above-mentioned parameters.

Since various materials of the upper layer on a wafer, polishing pad, slurry, and retaining ring interact in a course of polishing, the combination of polishing pad and retaining ring characteristics, the specific slurry mixture, and other polishing parameters, such as compression force or contact pressure between wafer and polishing pad, rotational and/or linear speed, temperature, etc., can provide specific polishing characteristics. Thus, for any material being polished, the pad and slurry combination is theoretically capable of providing a specified finish and flatness on the polished surface. For example, the nature of the slurry can have a dramatic effect. The slurry includes abrasive particles suspended in a solvent, which selectively may soften certain features of the pattern on the semiconductor wafer surface, thereby affecting the relative rate of removal of those features. It must be understood that additional polishing parameters, including the relative speed between the substrate and the pad and the force pressing the substrate against the pad, affect the polishing rate, finish, and flatness.

Therefore, for a given material whose desired finish is known, an optimal pad, retaining ring, and slurry combination may be selected. Typically, the actual polishing pad and slurry combination selected for a given material is based on a trade off between the polishing rate, which determines in large part the throughput of wafers through the apparatus, and the need to provide a particular desired finish and flatness on the surface of the substrate.

By nature, the removal of material during polishing is caused by interaction or friction between wafer, pad, and slurry particles. Polishing process, in particular a CMP process, to a great extent depends on such factors as friction characteristics of the material being treated, surface conditions of the treated material and the polishing pad, friction forces in the zone of contact of the polishing pad with the treated material, characteristics of the polishing slurry, the rate of wear of the polishing tool, the rate of removal of the material from the treated surface, etc.

Theoretical determination of friction forces and torques on parts participating in a polishing process, in particular in CMP, is extremely difficult, if possible at all for following reasons:

1) The friction force in the zone of contact between the relatively moving parts and a torque that occurs on these parts are functions of the aforementioned parameters of the polishing process.
2) The friction force in the zone of contact between parts participating in a relative motion has a non-linear dependence on the relative velocity between the parts. FIG. 3 shows a typical dependence of the friction force FFR between wafer and pad in the presence of fluid versus relative speed V.
3) The parts in contact participate simultaneously in three motions such as two rotations and one relative linear motion.
4) In the course of polishing, the polishing pad and the workpiece being treated constantly change their properties, e.g., due to variation in thickness and surface properties.

For the above reasons, for control and optimization of industrial technological processes, it is necessary to experimentally determine the friction properties of various materials used in real polishing conditions, as well as a friction behavior of interacting parts during the CMP process.

Since CMP systems of all types provide substantial flexibility in selecting materials used and parameters (variables) to control the polishing process, the manner in which materials and parameters are selected and optimized can be overwhelming.

Determination of the variables and selection of the materials for polishing a particular substrate in a particular manner typically is accomplished by estimation coupled with trial and error testing on a number of substrates. Such trial and error testing can consume an inordinate amount of time and materials before an appropriate combination of variables is found. Presently, there are no apparatus or methods available for controlled polishing and simulating a CMP system to determine the variables necessary to provide a particular polishing characteristic. Additionally, there are no methods or apparatus for optimizing variable values to achieve a particular polishing characteristic within a minimal amount of polishing time.

Another known apparatus for simulating and optimizing a CMP system is disclosed in U.S. Pat. No. 5,599,423, issued on Feb. 4, 1997 to Parker et al. The simulated CMP system disclosed therein comprises a polishing pad, a chuck for supporting a substrate, a positioner for positioning the polishing pad relative to the substrate (or vice versa), a chuck rotator for rotating the chuck, and a polishing pad rotator for rotating the polishing pad. The CMP system simulator is implemented as a computer program that is executed on a general purpose computer system. The simulator enables a user to enter particular simulation parameters that define polishing pad size and shape, substrate size, polishing pad dwell time at particular locations on the substrate, pad aging, pad to substrate pressure, rotational velocity of the pad relative to the substrate, and a number of passes of the substrate over the pad. From these parameters, the simulator calculates polishing results that indicate the amount of substrate material removed during polishing of the substrate.

In fact, though the apparatus disclosed is capable to simulate the operation of a CMP system and to calculate the results of a polishing process based on a set of predefined motion parameters and average data of material properties, it doesn't take into account changes of real material properties (such as removal rate, friction coefficient) and their variations during polishing, as well as pad conditioning. Also it doesn't allow for measuring forces, torques, and deformations in interacting parts in the course of a polishing process.

There is also known a method of polishing and planarizing semiconductor devices as disclosed in U.S. Pat. No. 5,036,015 "Method of Endpoint Detection during Chemical/Mechanical Planarization of Semiconductor Wafers" issued on Jul. 30, 1991 to Sandhu, et al. According to this method, the turntable of a CMP apparatus is driven to rotate by an electric motor, and changes in the friction between the wafer held by a wafer holding device on the turntable and the polishing pad for polishing the wafer are detected as changes in the electric current flowing through the electric motor.

Other examples of a CMP process control method based on measuring the running motor current in order to detect variations of the motor torque related to variations of mechanical parameters (such as friction force) in the zone of contact of the rotating pad with the surface being treated, are described, e.g., in U.S. Pat. No. 5,948,700 issued on Sep. 7, 1999 to Zheng, et al.

As described below, this known technique also is not applicable for accurate measuring forces ant torques and for polishing process control and optimization.

FIG. 4 illustrates a typical dependence of the electric current running through the electric motor versus a load or torque applied to the motor shaft. Since no load current $I_o$ flows through the electric motor when no load is applied thereto, it is difficult to accurately detect the level of friction developed on the platen. Furthermore, the current flowing through the motor greatly depends on the voltage of corresponding power supply and on speed of rotation. Therefore even small variations in the power supply voltage and changes in the rotation speed cause significant changes in the current.

In addition, since in the aforementioned CMP system both the platen and the wafer holding device are connected to respective motors through corresponding transmissions, accuracy of friction measurements based on the motor current may be affected by losses and slippage in the transmissions.

A method and apparatus for controlling a polishing process described in U.S. Pat. No. 5,738,562 issued on Apr. 14, 1998 to Doan, et al. are based on measurement of variations that occur in translational (lateral) motions of the polishing platen, related to the variations in friction coefficients of different film materials. These method and apparatus are based on indirect measurement technique, result in very approximate evaluation of the friction variations, cannot accurately measure the friction coefficients and thus, are not suitable for practical control of the CMP process.

There are also another known polishing apparatus and method for planarizing a layer on a semiconductor wafer, as disclosed in U.S. Pat. No. 5,948,205, issued on Sep. 7, 1999 to Kodera et al. According to the disclosure, the above method comprises steps of measuring friction between the layer being polished and a turntable carrying a polishing slurry during polishing, determining the polishing rate from the measured friction, determining the extent of polishing by integrating the polishing rate over time, and terminating the polishing operation when the measured polishing extent coincides with a predetermined value. More specifically, the polishing apparatus disclosed in this patent, comprises means for measuring friction developed between the layer being polished and a turntable carrying a polishing slurry during the polishing operation, determining the rate of polishing the layer based on the measured friction and determining the extent of polishing of the layer by integrating the polishing rate over time.

The above method and apparatus are based on the assumption that "the friction between the layer being polished and the turntable carrying a polishing slurry and the rate of polishing the layer show a relationship of one-to-one correspondence."

By utilizing this relationship, the authors of the aforementioned patent propose to measure the friction caused between the layer being polished and a turntable carrying a polishing slurry during the polishing operation, determine the rate of polishing the layer from the measured friction, determine the extent of polishing of the layer by integrating the polishing rate with time, and terminate the polishing operation upon coincidence of the extent of polishing of the layer with a predetermined value.

The disclosed apparatus further comprises a system of measuring the distortion of the shaft connected to the polishing turntable to determine the load due to friction caused at the turntable and converting the measured value into an electric signal to control the operation of the electric motor for driving the turntable.

A tester and a method for measuring individually various friction characteristics, such as friction forces, torques, and normal compression forces between relatively moving parts are known and described in pending U.S. patent application Ser. No.09/624,500 filed on Jul. 24, 2000 by the same applicants. This universal friction tester for testing tribological properties of materials comprises a frame with a carriage sliding in vertical guides and supporting a slide moveable in a horizontal direction. The slide supports a stationary upper specimen, which engages a moveable lower specimen, located in a replaceable module attachable to a base plate of the frame. The modules may be of a rotary, reciprocating, a block-on-ring, or any other type, required for different test conditions. Testing can also be carried out with heating or with the supply of oil or other fluid in the zone of contact between the specimens.

Although the tester described above is suitable for testing and measuring various tribological characteristics of materials, these tester and the method are not applicable for simulating real CMP conditions, since only one of two contacting parts rotates, and a slurry having certain viscosity can behave differently from real polishing conditions. Furthermore, the known method and tester provide measurement of a friction torque only on one of the parts, i.e., on the stationary part, which is unsuitable for CMP where both parts participate in rotation. Another disadvantage of the known method and apparatus is that the test is conducted without pad conditioning, which does not simulate real CMP conditions. As described above, the operation of conditioning helps to refresh the polishing pad surface in order to keep polishing rate constant and uniform. With known polishing methods, the timing of conditioning or replacing the pad in most cases is determined on the basis of experience of the operator or other empiric basis. This means that the rate of polishing a semiconductor wafer is not accurately controlled and therefore cannot be kept at a constant level.

An apparatus and a method for conditioning and monitoring media used for chemical-mechanical planarization are known, as disclosed in WO Pat. No. 01/15865 A1, issued on Mar. 8, 2001 to Moore. According to the disclosure, a CMP machine contains a conditioning body attached to a support and a force sensor connected to the conditioning body support for measuring a friction force developed in the interface between the conditioning body and a polishing pad. The apparatus allows monitoring and controlling of a conditioning process. However, as has been stated above and is shown in the aforementioned patent, the frictional force can be a function of the surface characteristics of the pad and/or of the conditioning tool, as well as a function of the normal compression force and the relative velocity between the two surfaces. Therefore, a demand for more accurate control of the pad conditioning still exists.

Thus, the known methods and apparatus do not provide full control and measurement of real friction characteristics inherent in a CMP process. Therefore, the prior-art technique is not suitable for complete control and optimization of the CMP process and for selection of most optimal pairs of materials for friction under specific operation conditions.

OBJECTS OF THE INVENTION

It is an object of the present invention to provide effective, accurate, universal, and reliable method and apparatus for a controlled polishing process such as CMP. Another object is to provide a method and apparatus, which control CMP processes on the basis of combined direct mechanical, acoustical, and thermal measurements of polishing conditions. It is another object to provide a method and apparatus for directly measuring a friction coefficient in a CMP process under various operation conditions and with the use of different polishing materials. Yet another object is to provide an apparatus and method for a CMP process with controlled conditioning of the polishing pad surface.

BRIEF SUMMARY OF THE INVENTION

The invention provides an apparatus for a controlled polishing process which is capable of simultaneously measuring compression and friction forces, developed in contact between an object to be polished (e.g., a semiconductor wafer) and a polishing pad, and torques developed on the object and pad. The apparatus comprises a rigid frame with a base and a vertical column, a rotational polishing head, which can be positioned vertically and horizontally, and holds an object, and a polishing pad with a rotary or orbital drive installed on the frame under the polishing head. The polishing head is attached to the positioning mechanism via force sensors and a torque sensor, while another torque sensor can be placed between the polishing pad and the frame to which it is attached. Another sensor, measuring a compression force between the object and the pad and corresponding friction response (force or torque), can be installed between the head and an object holder (e.g., a wafer carrier). In the process of polishing, the polishing head rotates together with the object in contact with the polishing pad and at the same time performs radial movements with respect to the center of the polishing pad, while sensors simultaneously measure corresponding forces and torques. A data processing unit of the apparatus receives the data signals from the sensors and computes process parameters, such as friction coefficient, removal rate, etc. The apparatus makes it possible to find operation conditions most optimum for specific speeds of the head and pad with reference to materials of the wafer, pad and polishing slurry.

Additionally, the invention provides the aforementioned apparatus and a method, wherein groups of high-frequency acoustic emission sensors are built into components of the rotating head and of the object holder, so that in addition to measuring compression and friction, the apparatus also measures high-frequency acoustic emission signals corresponding to changes that occur in the interface between the object and the pad. All groups of sensors work simultaneously and their measurement data are processed and analyzed by a data acquisition, processing and control units for obtaining accurate and reliable results. The analysis of these signals allows to control a polishing process more effectively and accurately and to obtain better polishing results.

In addition, the apparatus of the invention is equipped with a pad conditioner (of a brush or abrasive type) is attached to the force sensors measuring compression and friction between the conditioner and the pad. The data processing unit receives the data signals from these sensors, computes parameters of conditioning, and controls polishing process for obtaining repeatable and accurate results.

DETAILED DESCRIPTION OF THE INVENTION

The applicants have found that control and optimization of polishing based only on friction force or friction torque measurements are not accurate enough to satisfy requirements of modern semiconductor fabrication. A much more important parameter, characterizing properties of contacting materials and degree of their interaction, is a coefficient of friction (COF) or friction coefficient, which is a ratio of a friction force between two surfaces to a force compressing these surfaces in perpendicular direction. Each pair of interacting materials has a very specific value of the friction coefficient, which is substantially constant for any given pair of materials and can be used as a major parameter in simulation and optimization of a polishing process.

Figure 1A:
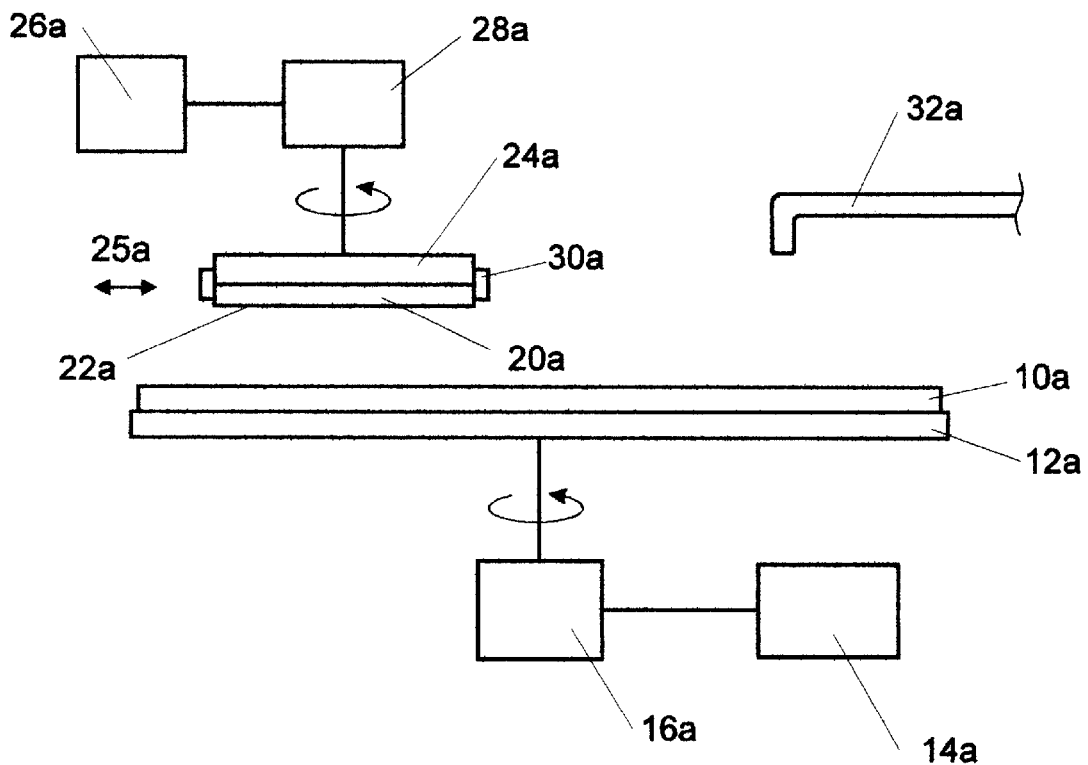
FIGS. 1A and 1B are schematic views of known polishing apparatuses with rotating drive.
Figure 1B:
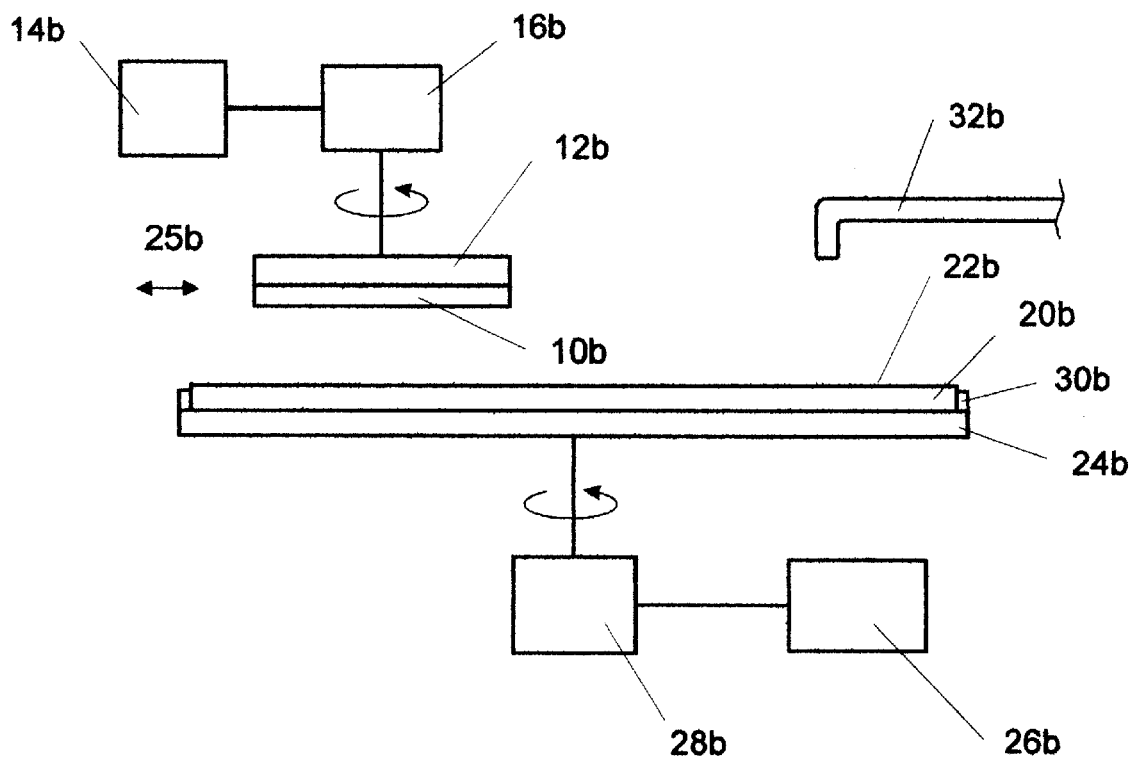
Figure 2:
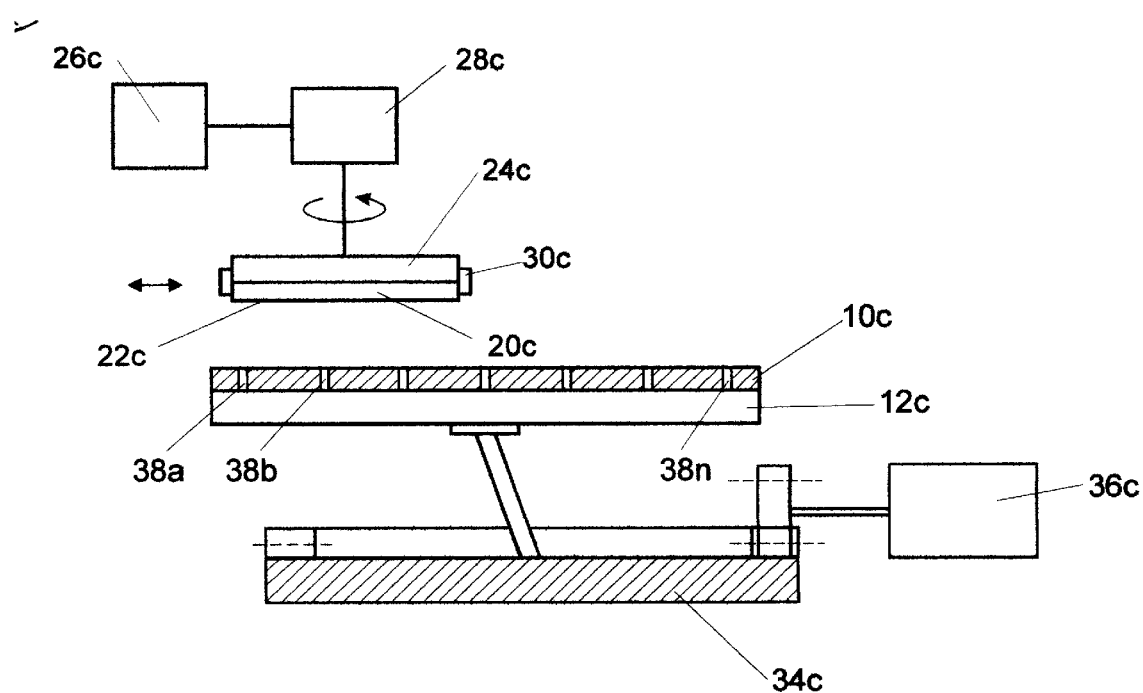
FIG. 2 is a schematic view of a known polishing apparatus with orbital drive.
Figure 3:
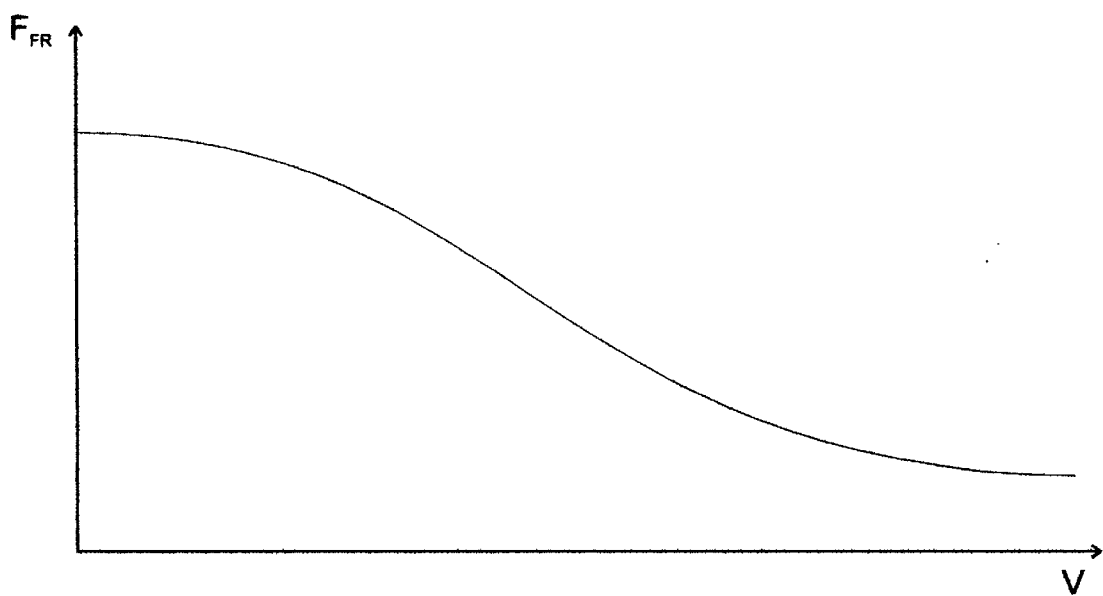
FIG. 3 is a graph illustrating effect of speed on friction.
Figure 4:
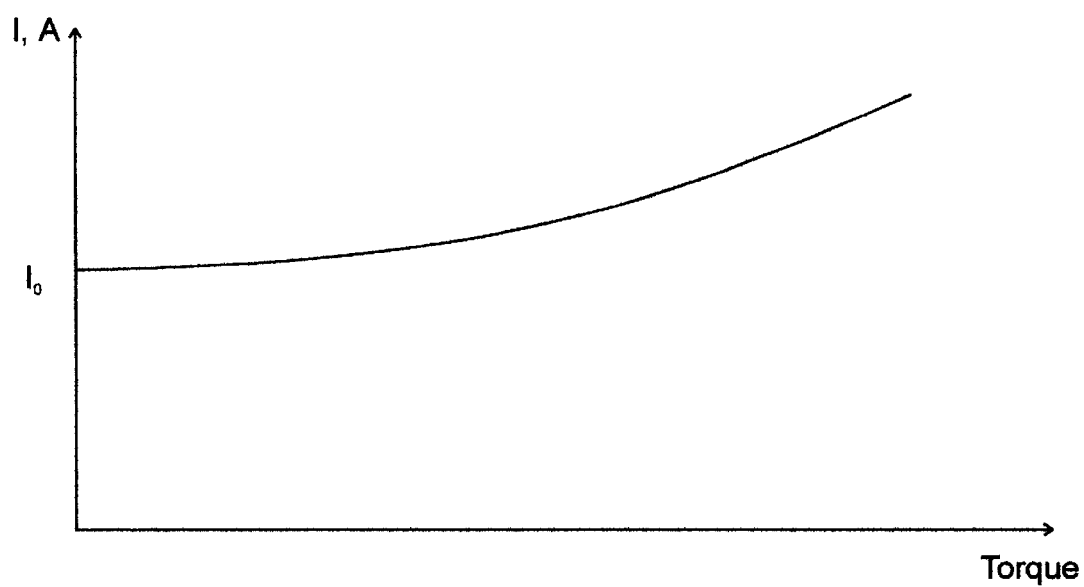
FIG. 4 is a graph illustrating a relationship between a current in electric motor and a loading torque in a polishing process.
Figure 5:
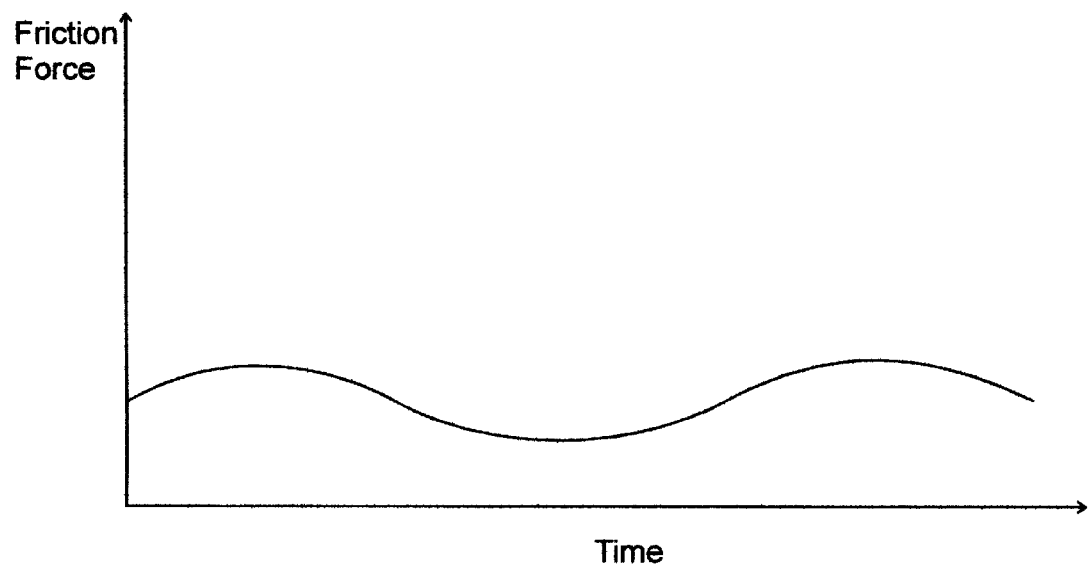
FIG. 5 is a graph of a friction force versus time.
Figure 6:
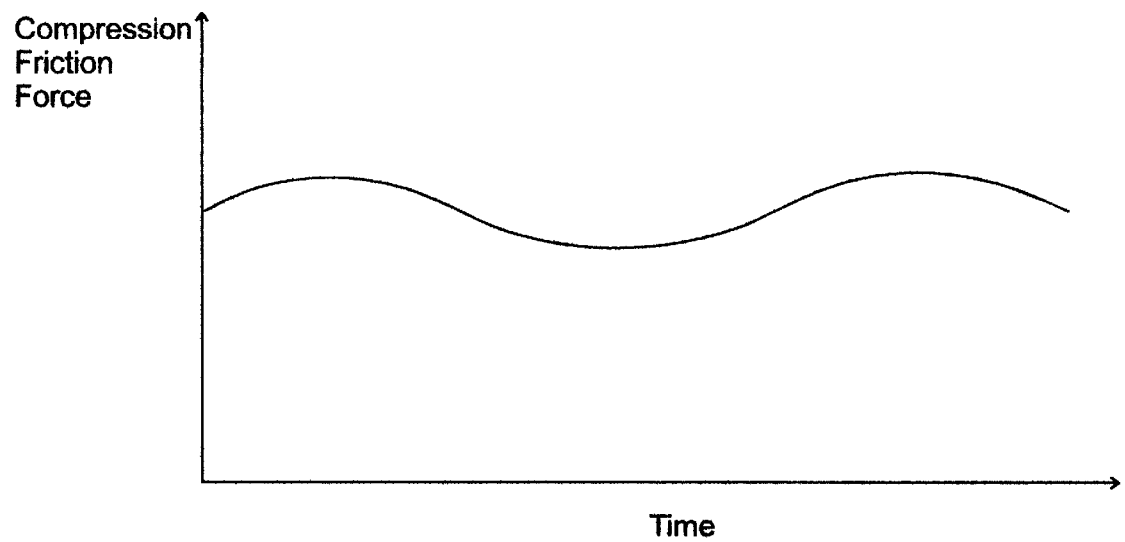
FIG. 6 is a graph of a compression force versus time.
Figure 7:
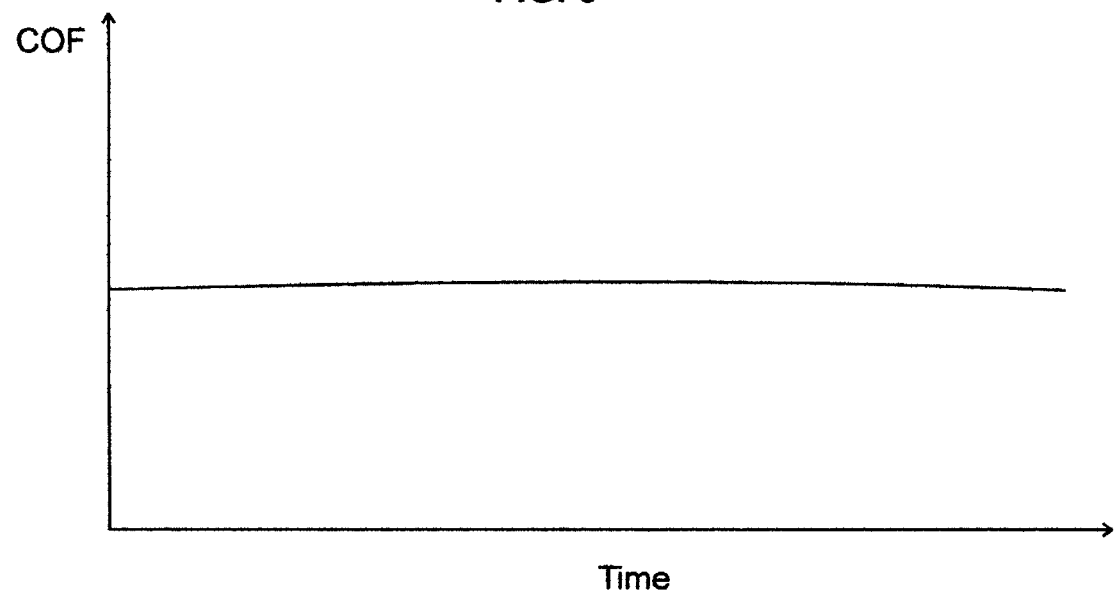
FIG. 7 is a graph of a friction coefficient versus time.

The above statement can be explained with reference to FIG. 5, which is a graph illustrating typical behavior of a friction force measured between a semiconductor wafer and a polishing pad during polishing. Significant variations in the friction force can be related to changes in friction properties of both the wafer and the pad, as well as to variations in the normal force that compresses these two parts. FIG. 6 shows the behavior of the normal force during this polishing process, which also oscillates (e.g., due to runout or non-flatness of a pad, or instability of a loading mechanism), while the friction coefficient, shown in FIG. 7, remains constant. While measuring the friction force alone, without the normal compression force, one may come to a false conclusion that during polishing friction properties of the materials participating in friction engagement vary, which is not true.

Figure 8:
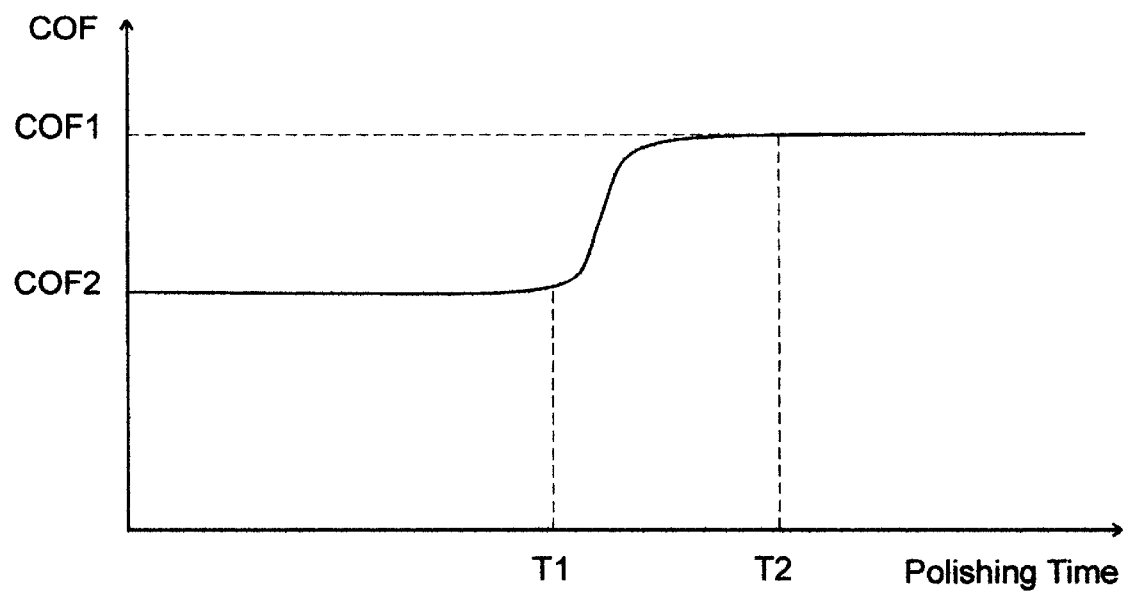
FIG. 8 is a graph of a friction coefficient versus polishing time for a two-layer structure.
Figure 9:
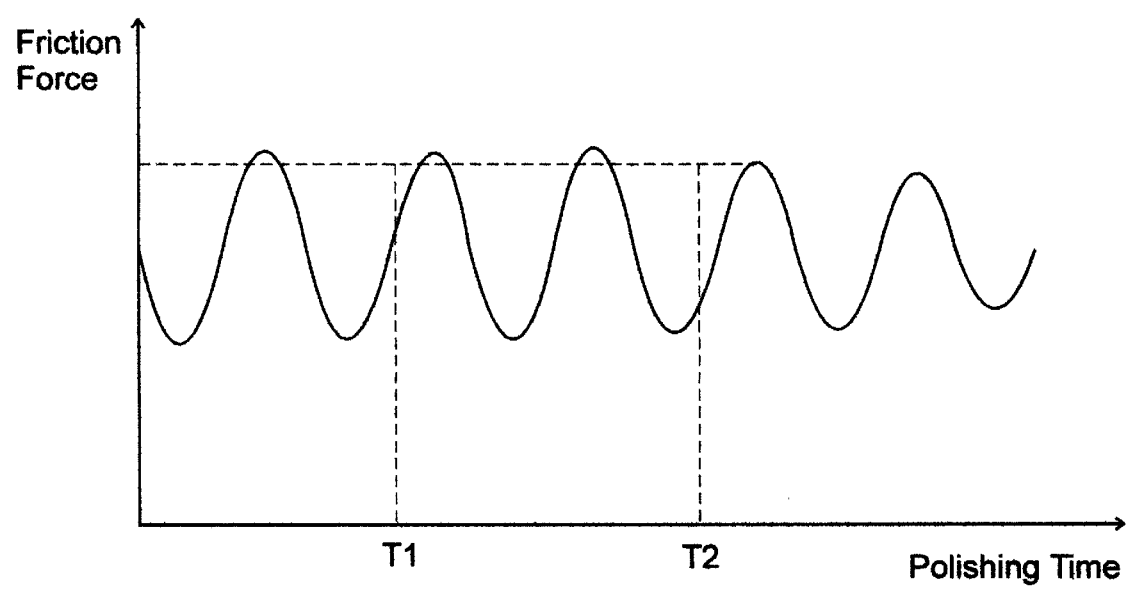
FIG. 9 is a graph of a friction force versus polishing time for a two-layer structure.

Another example of friction coefficient measurements is shown in FIG. 8, which represents behavior of COF during polishing of the wafer with two layers of different materials on the surface. Each of these two materials (1) and (2) has a specific value for the coefficient of friction against the pad, namely COF1 and COF2. In the beginning of the polishing process, when the uppermost layer on the wafer consists of material (1), the friction coefficient measured in the course of polishing equals COF1. Since during the polishing the outer layer is gradually removed, there is a moment of time (T1) when underlying layer of material (2) starts to be partially exposed, and at a moment T2 the first layer is removed completely, the whole wafer surface is covered with material (2), and the friction coefficient in this system becomes equal COF2. By registering the time moments T1 and T2, one can make a judgment about such characteristics as the material removal rate, uniformity of the material removal over the wafer surface and use this information to determine an end point of the process.

Figure 10:
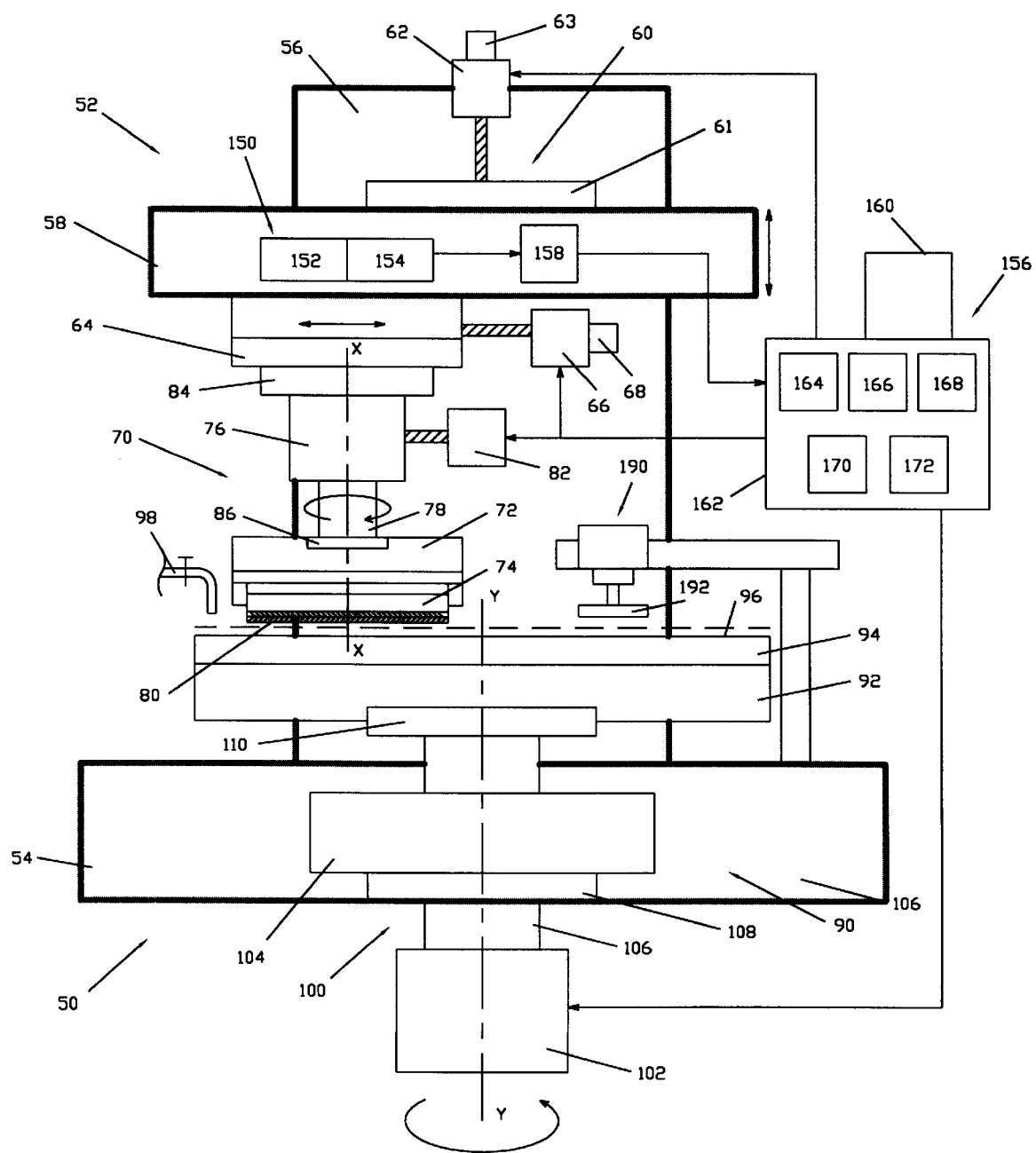
FIG. 10 is a schematic view of an apparatus of invention.

A polishing apparatus of the present invention is shown schematically as a whole in FIG. 10, which is a front view of the apparatus. As can be seen from this drawing, the polishing apparatus, which in general is designated by reference numeral 50, has a frame 52 consisting of a base plate 54, a vertical column 56, and a cross bar 58. The vertical column 56 supports a vertical positioning mechanism 60, e.g., a carriage 61 with a lead screw and a nut (not shown), which is connected to the cross bar 58, can move in vertical direction and is driven by a first drive mechanism 62, e.g., by a reversible electric motor coupled with the aforementioned lead screw. A first position detector 63 is mechanically coupled with the first drive mechanism 62 and generates a vertical position data signal. The vertical positioning mechanism 60 supports a horizontal positioning mechanism 64, which is also attached to the cross bar 58 and is capable to move in a direction parallel to the base plate 54, either linearly or rotationally around the vertical column, by means of a second drive mechanism 66. A second position detector 68 is mechanically coupled with the second drive mechanism and generates a lateral position data signal.

A head assembly, which in general is designated by reference numeral 70, is mounted on the horizontal positioning mechanism 64 and can rotate around a vertical axis X—X. It can also move along with the horizontal positioning mechanism 64 in a horizontal direction parallel to the base plate 54.

Figure 11:
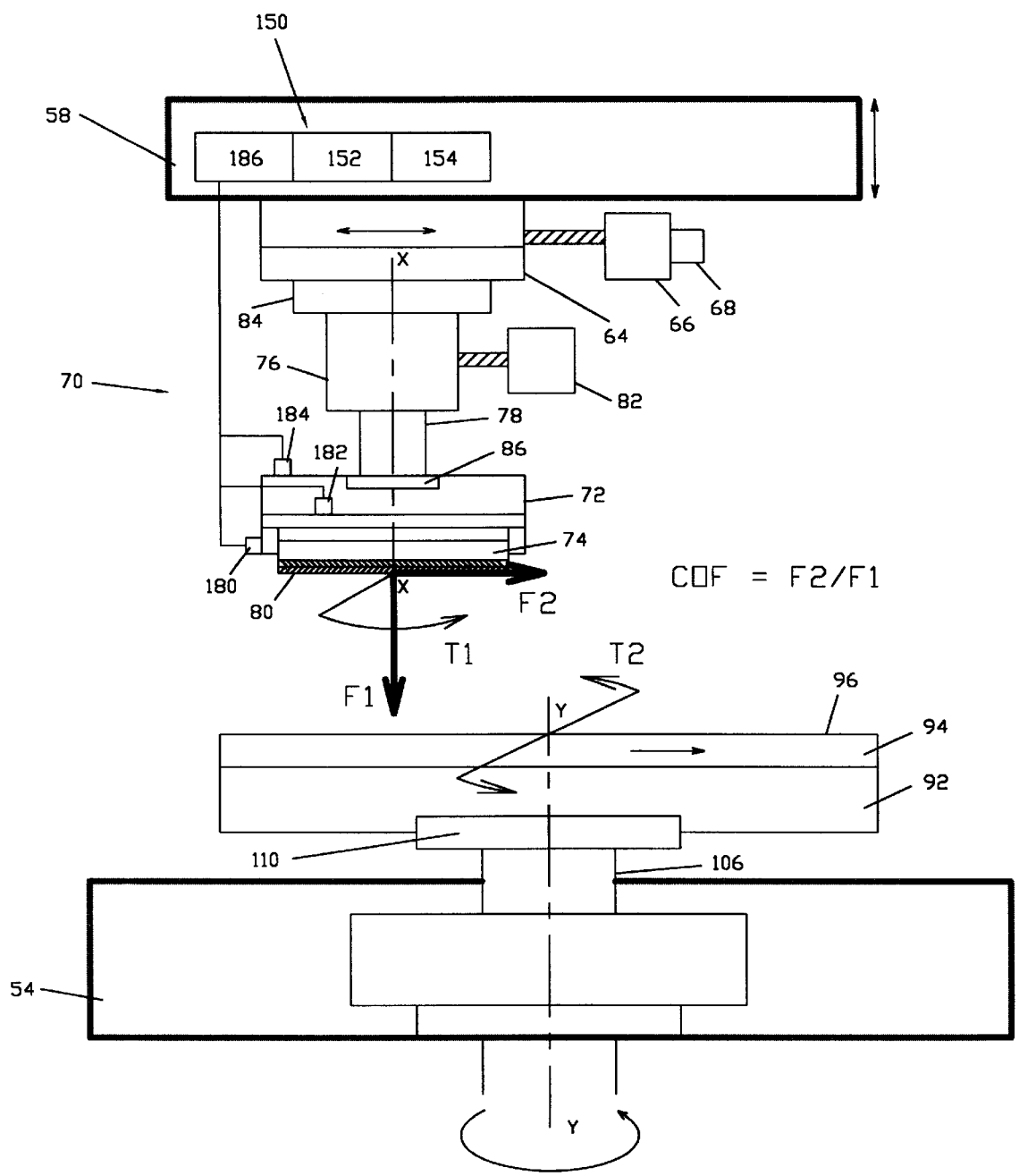
FIG. 11 is a schematic view of the apparatus of the invention with more detailed illustration of the polishing head.

FIG. 11 is a schematic view of the apparatus of the invention with more detailed illustration of the polishing head. As can be seen from this drawing, the head assembly 70 consists of a holding chuck 72 for holding and supporting an object 74 be treated and a rotating unit 76 with a shaft 78. The object, e.g., a semiconductor wafer, has a front surface 80, which has to be polished during a polishing. The head assembly 70 is coupled with a third drive mechanism 82, e.g., electric motor, which rotates the head assembly 70 around the axis X—X.

A first sensor assembly 84 mounted on the head assembly 70 is installed between the horizontal positioning mechanism 64 and the rotating unit 76. The first sensor assembly 84 has means for detecting a compression force F1 acting along the axis X—X in a direction perpendicular to the front surface 80 of the wafer 74. The first sensor assembly 84 also has means for detecting a friction force F2 acting in a second direction parallel to the front surface of the wafer and a means for detecting a friction torque T1 acting in respect to the axis X—X. It is understood that the compression force F1 and the friction force F2 occur only when the front surface 80 of the object 74 is in contact with the pad and the friction force F2 occurs only when both parts participate in a relative motion. For convenience of the drawing, however, these forces are conventionally shown on the object when the head assembly 70 is raised over the pad. Symbol T1 designates a friction torque on the head assembly 70.

The polishing apparatus 50 can also be equipped with a second sensor assembly 86 that could be mounted on the head assembly 70 and is provided with means for combined sensing and detecting forces F1, F2 and friction torque T1. In the embodiment illustrated in FIG. 10, the second sensor assembly 86 is installed between the shaft 78 and the holding chuck 72.

The base plate 54 of the tester frame 52 supports a polishing module 90 (FIG. 10), which has a platen 92 with a polishing pad 94. The polishing pad 94 is attached to the platen 92 so that it can be removed and replaced, e.g., by means of adhesive film (not shown). The uppermost surface 96 of the pad facing the object, e.g., a semiconductor wafer, is a working surface of the pad. During polishing, this surface is in contact with the front surface 80 of the wafer and carries a polishing slurry delivered by a slurry feeding system 98 (FIG. 10). The polishing module 90 also contains a polishing drive mechanism 100, which is used for moving the platen 92 with the pad 94 relative to the semiconductor wafer 74. The polishing drive mechanism 100 consists of a polishing drive motor 102 and a transmission unit 104 with a drive shaft 106 that connects the polishing drive motor 102 with the platen 92. The transmission unit can be selected from a rotary type transmission, which transmits rotation from the polishing drive motor to a polishing platen 92, and an orbital type transmission, which transforms rotation of the polishing drive motor 102 into orbital motion of the platen 92.

The transmission unit 104 is connected to the base plate 54 of the frame 52 via a third sensor assembly 108 having sensors for combined sensing and detecting forces F1, F2, and friction torque T2 developed during rotation of the platen 92 around the axis Y—Y which passes through the center of the platen.

A fourth sensor assembly 110 having sensors for combined sensing and detecting forces F1, F2, and friction torque T2 can be mounted on the platen 92 and attached to the drive shaft 106 of the transmission unit 104 and to the platen 92.

During polishing, the front surface 80 of the semiconductor wafer 74 is brought into contact with the working surface 96 of the polishing pad 94 mounted on the platen 92, and a compression force F1 acting in a direction perpendicular to the front surface of the wafer and to the working surface of the pad 94 is applied by feeding moving the vertical positioning mechanism 60 downward in a vertical direction (FIGS. 10 and 11). The head assembly 70 supporting the workpiece rotates around the axis X—X and at the same time performs radial motions relative to the center of the platen 92. These radial motions are caused by the horizontal positioning mechanism 64, while the platen 92 rotates in respect to the axis Y—Y or performs orbital motions. Motions of the platen 92 with the pad 96 relative to the semiconductor wafer 74 causes a friction force F2 acting in a direction parallel to the front surface of the object and to the working surface of the pad 96, a friction torque (moment of forces) T1 developed around the axis X—X of the head assembly 70, and a friction torque T2 developed around the axis Y—Y of the platen 92.

Sensor assemblies 84, 86, 108, 110 comprise plurality of sensor elements which can be made in the form of a force sensor detecting a force acting in a direction perpendicular to the working surface 96 of the pad 94 and to the front surface 80 of the object 74 (hereinafter referred to as a first force sensor), a force sensor detecting a force acting in a direction parallel to the working surface 96 of the pad 94 and to the front surface 80 of the object 74 (hereinafter referred to as a second force sensor), and a torque sensor detecting a torque (moment of forces) acting in respect to an axis parallel to the axis X—X (hereinafter referred to as a third sensor) or to the axis Y—Y (hereinafter referred to as a fourth sensor).

Aforementioned sensors detect the compression force and corresponding friction response and generate output data signals as a plurality of compression data signals and friction data signals.

Figure 12:
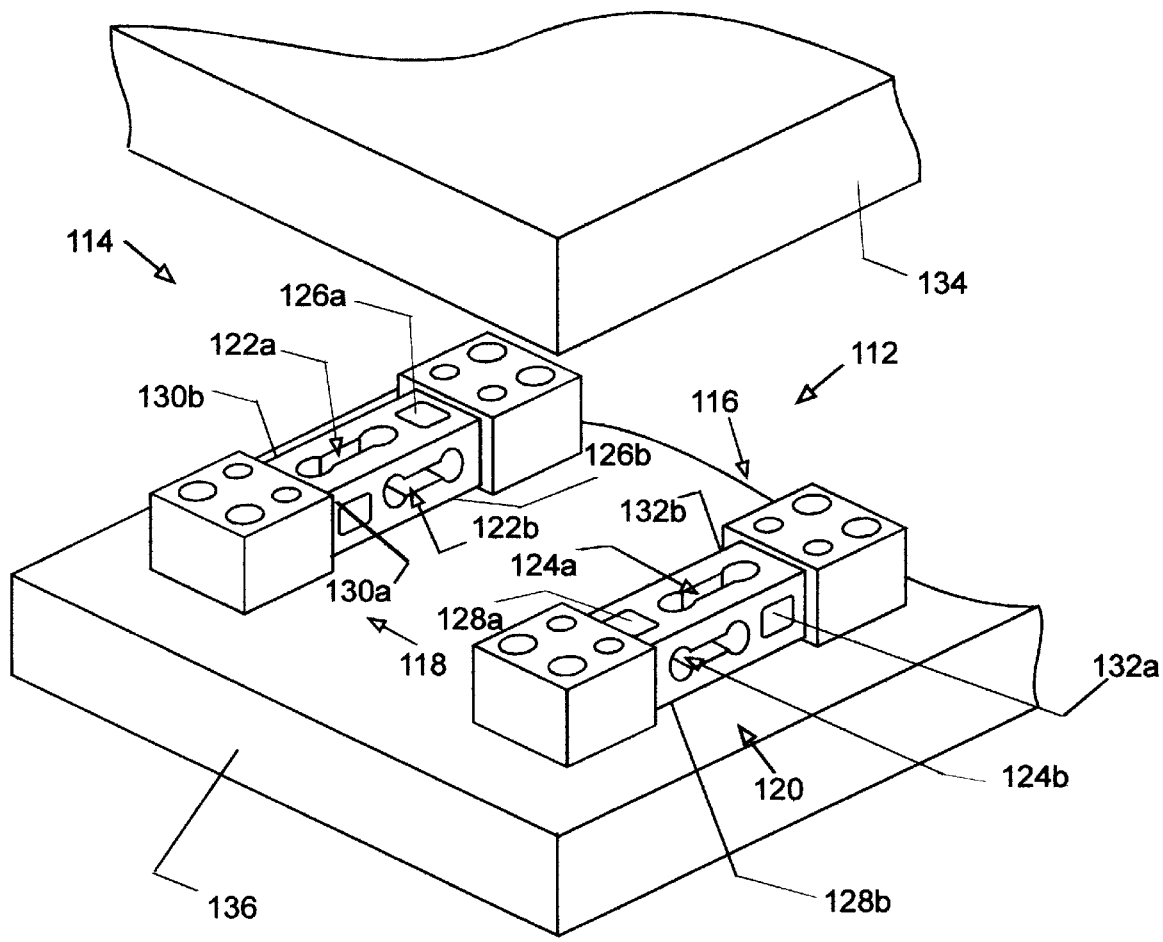
FIG. 12 is a three-dimensional view of a bidirectional force sensor used in the apparatus of the invention.

The first force sensor and the second force sensor may be of the type shown in FIG. 12 and described in pending U.S. patent application Ser. No. 09-624512 filed by the same applicants on Jul. 24, 2000.

As can be seen from FIG. 12, the force sensor 112 comprises a combination of two deformation-sensitive elements 114 and 116 for sensing equal deformations acting simultaneously in two opposite directions for eliminating misbalance that could occur in the measurement system in the case of a single sensing element. Each deformation-sensitive element 114 and 116 comprises a deformable beam 118 and 120, respectively, having through longitudinal slots 122a, 122b and 124a, 124b, respectively, extending in different and non-parallel directions and overlapped within the body of the beam. Each deformation-sensitive element deforms in one direction under the effect of a compression force measured by two pairs of strain gauges 126a, 126b and 128a, 128b, respectively, located on opposite sides of the beam near one end of the beam, and in another direction under the effect of a friction force measured by another two pairs of strain gauges 130a, 130b and 132a, 132b, respectively, located on opposite sides of the beam near the other end of the beam. Two aforementioned deformation-sensitive elements 114 and 116 are sandwiched between two plates 134 and 136. The deformation-sensitive elements 114 and 116 are arranged between the plates 134 and 136 in a diagonally symmetrical positions so as to transmit forces between both plates and at the same time to ensure limited freedom of movement between both plates to allow deformations caused by the applied forces.

Figure 13:
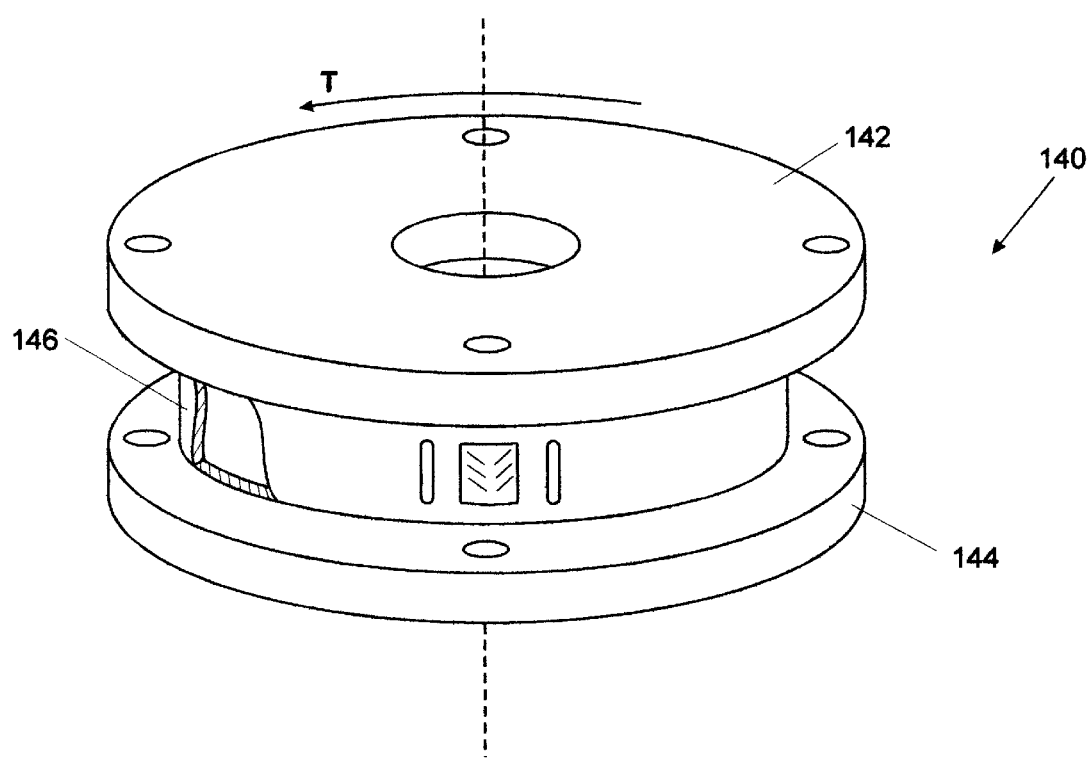
FIG. 13 is a three-dimensional view of a torque sensor used in the apparatus of the invention.

The third sensor and the fourth sensor may be torque sensors of the type shown in FIG. 13, which is a three-dimensional view of the sensor. It can be seen that the torque sensor 140 consists of two disks 142 and 144 with a thin-walled cylindrical body 146 sandwiched between the disks. The thin-walled cylindrical body 146 is made of a spring material and has a shear-sensitive element 148, e.g., strain gauge, for detecting torsion shear deformation of the cylindrical body 146 due to applied torque (moment of forces) Tz acting in respect to the vertical axis of the sensor.

The apparatus of invention further includes a transducer assembly 150 (FIG. 10) connected to the sensor assemblies 84, 86, 108, 110 and having a compression transducing unit 152 and a friction transducing unit 154. The compression transducing unit 152 acquires output data signals from the first force sensor, the friction transducing unit 154 acquires output data signals from the second force sensor and from the torque sensor. Both the compression transducing unit 152 and the friction transducing unit 154 are equipped with electronic amplifiers, buffers and filters (not shown) for amplifying and processing the acquired data signals.

The apparatus of invention is also equipped with a control system 56 connected to the transducer 150 via a connecting device 158 (FIG. 10) such as a slip-ring with sliding contacts or a wireless data transfer system. The control system 156 consists of a display device 160, e.g., an electronic graphic monitor or a numerical display for displaying and monitoring data signals and polishing parameters and a data processing system 162, e.g., computer-based controller. The data processing system 162 includes a data receiving unit 164, e.g., a multi-channel data acquisition board for receiving data signals from the transducer assembly 150, a recording unit 166, e.g., a computer hard disk, memory, or storage system for recording and storing the received data signals, a computing unit (arithmetic module) 168, e.g., a computer CPU or stand-alone logical controller for computing a predetermined set of polishing parameters based on received data signals, an analyzer 170, e.g., a data analysis software or an algorithm for retrieving and analyzing data signals and polishing parameters and for optimizing polishing parameters according to predetermined optimization criteria, and a control unit 172, e.g. motor controllers for controlling operation of the first drive mechanism 62, the second drive mechanism 66, the third drive mechanism 82, and the polishing drive motor 102.

Figure 14:
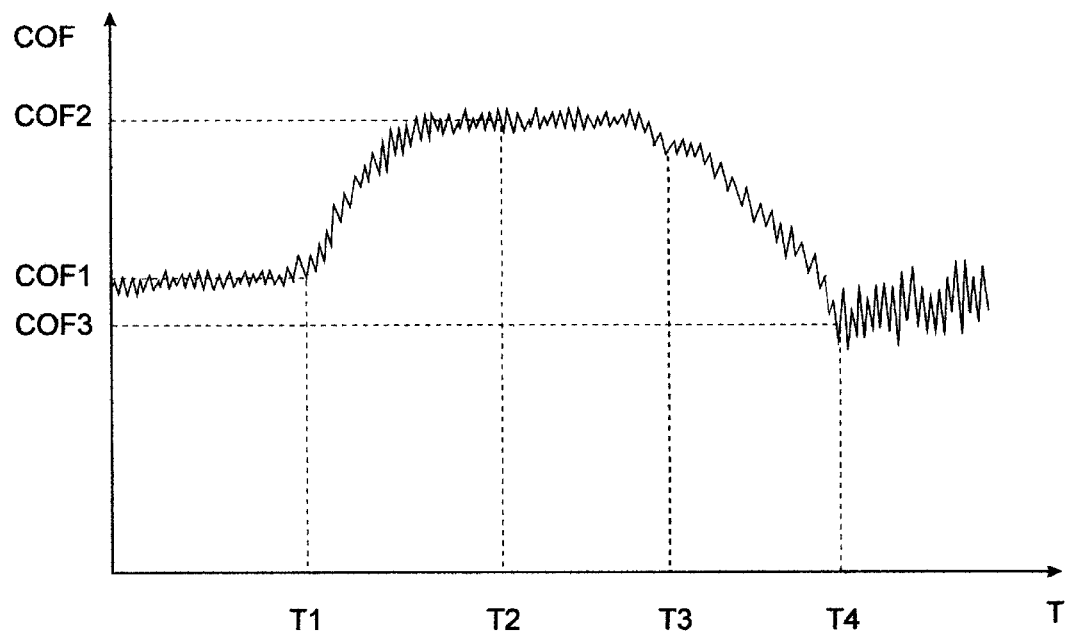
FIG. 14 is a graph of a friction coefficient versus polishing time for a three-layer structure processed in the apparatus of the invention.

As has been shown above, the coefficient of friction, which is defined as a ratio of the friction force to a corresponding compression force, is one of the most important parameters characterizing interaction between moving parts and various materials participating in friction contact. FIG. 14 is a graph illustrating variations of the friction coefficient COF between the workpiece and the pad versus time in a course of polishing a semiconductor wafer with multiple layers of different materials on the front surface. As can be seen from FIG. 14, an initial portion of the graph from 0 to moment T1 on the time scale corresponds to polishing of the uppermost layer with the friction coefficient COF1. After moment T1 a second layer with a higher friction coefficient COF2 starts to be partially exposed, and the measurement of the total friction coefficient having an intermediate value between COF1 and COF2 shows the presence on the front surface of both materials simultaneously. After moment T2, when the first layer is completely removed, a portion of the graph between time marks T2 and T3 on the time scale corresponds to the presence of the second material on the front surface of the wafer. After moment T3 a third layer with the friction coefficient COF3 starts to be partially exposed on the front surface, and after moment T4 the second layer is completely removed and the third layer of material is completely exposed on the front surface of the wafer. Knowing values of the friction coefficient for various combinations of different wafer materials and polishing pads, it becomes possible to effectively control the polishing process, in particular, to discontinue polishing once a predetermined specific value of the friction coefficient is reached.

As can be seen from FIG. 14, all three layers of different materials not only have different average values of the friction coefficients, but also show different behavior in the course of polishing, namely different pattern of variation of the friction coefficient within the same layer. A standard deviation, peak values of data signals and of friction coefficients in selected periods of time can be used as criteria for evaluating the aforementioned variations. The above criteria are recommended, as they themselves are also important parameters of a polishing process.

Figure 15:
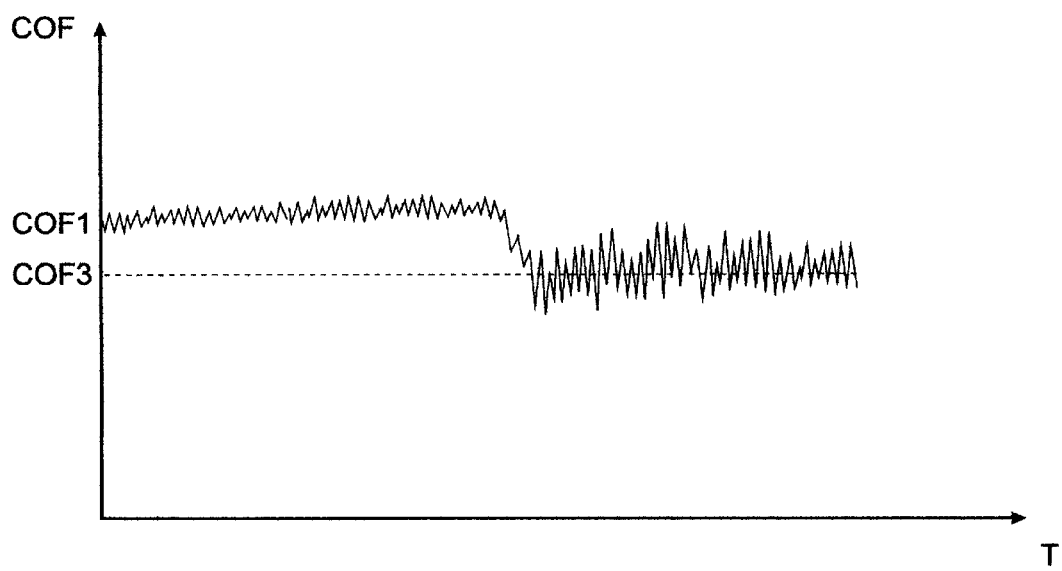
FIG. 15 is a graph of a friction coefficient versus polishing time for a two-layer structure processed in the apparatus of the invention.

FIG. 15 is a graph that illustrates variations of the friction coefficient versus polishing time for a wafer having two sequential layers with close average values of friction coefficients COF1 and COF3. In that case, measurements based only on the average values do not allow accurate detecting the point of transition in polishing from one layer to another, and detection of signal peaks and standard deviations would help to more effectively control the polishing process.

The control system 156 (FIG. 10) is also electrically connected to the first drive mechanism 62 of the vertical positioning mechanism 60 and has a closed loop control with a feedback from the compression transducing unit 152, i.e. the control unit 172 of the data processing system 162 generates control signals for controlling the first drive mechanism in response to the compression data signal, thus allowing for controlling and maintaining the compression force applied to the wafer in the course of polishing.

Another important characteristic of the polishing process that can be used for effective control of polishing is a high-frequency acoustic emission signal, which represents elastic waves generated in the interface between the wafer and the pad and propagating through contacting parts. The amplitude and frequency spectrum of an acoustic emission signal depends on hardness, density and other mechanical properties of interacting parts and on intensity of the interaction, i.e., polishing. Therefore, an acoustic emission signal also can be used as an additional factor for identifying materials on the front surface of the wafer and for polishing process monitoring and control. Since generation of elastic waves is associated with interaction between small features on the surface of the interacting parts, the acoustic signal generated during such interaction has a very high frequency. Thus, assuming that microscopic unevenness on the wafer surface is typically on the order of microns or fraction of a micron and that a typical relative speed of the wafer and platen is about 1 m/s, one can expect a corresponding acoustic emission signal with frequency components from few hundred kilohertz up to several megahertz.

Figure 16:
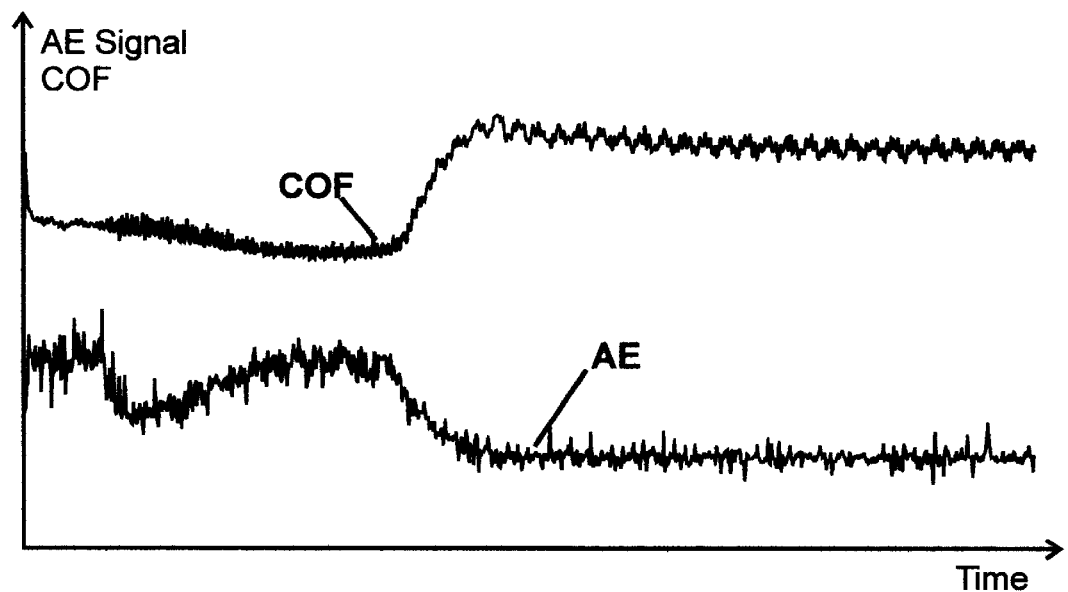
FIG. 16 is a graph of a friction coefficient and an acoustic emission signal versus polishing time for multi-layer structure processed in the apparatus of the invention.

FIG. 16 illustrates variations in a coefficient of friction COF between a workpiece and the pad. The same graph shows a curve of a high-frequency acoustic emission (AE) signal versus time in polishing a semiconductor wafer with multiple layers of different materials on the front surface. As can be seen from FIG.16, the first layer on the front surface of the wafer and the second layer have similar average values of the friction coefficient and similar variations in the friction coefficient. Therefore it would be difficult in that case to distinctly define the moment of transition from the first layer to the second one on the friction measurements alone, and the acoustic emission (AE) signal will contribute to finding the threshold of the aforementioned transition.

Figure 17:
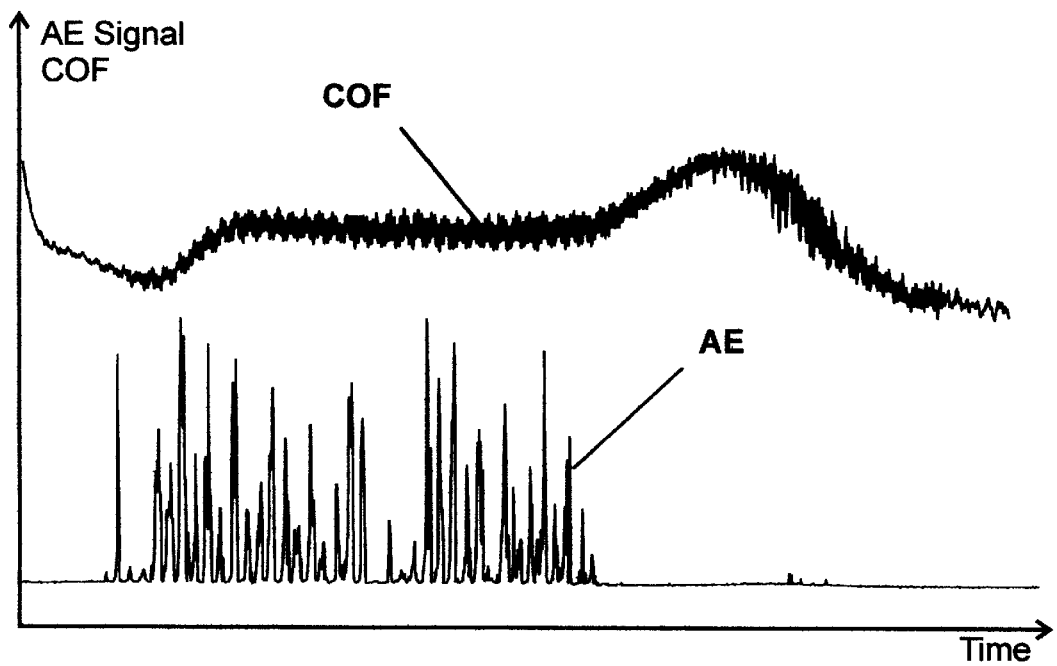
FIG. 17 is a graph of a friction coefficient and an acoustic emission signal versus polishing time for a two-layer structure processed in the apparatus of the invention.

Additionally, high-frequency acoustic emission signal can be used for monitoring localized events in the interface between interacting surfaces, such as single scratches, micro-cracks or local delamination of the surface layers. FIG. 17 shows experimental graphs of the friction coefficients and high-frequency acoustic emission signals during the polishing of a multi-layered semiconductor wafer with low adhesion of the second layer to the substrate. As can be seen from FIG. 17, polishing of the second layer is characterized by random spikes with a low background level of AE signal. A subsequent surface analysis confirmed that the spikes shown in this graph represent local delaminations of the film from the substrate. Therefore, detection of peak values in high-frequency acoustic emission signals in combination with the average level of these signals would provide more effective and accurate polishing control.

Figure 18:
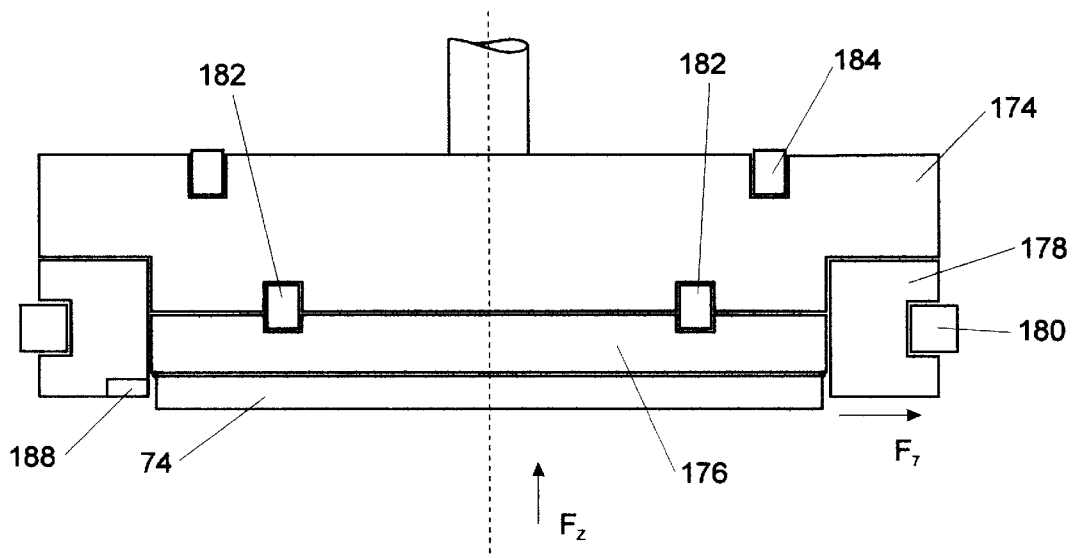
FIG. 18 is a schematic view of a wafer carrier of an apparatus of invention.

High-frequency elastic waves can propagate with minimal losses through contacting solid materials such as metals, ceramics or hard plastics, while having significant losses propagating through air and soft materials like rubber. Therefore it's critical for reliable detection of high-frequency acoustic emission signal to provide a continuous path from a source of the signal to a signal detector, i.e., from the wafer front surface to the high-frequency acoustic emission sensors. FIG. 18 is a schematic side sectional view of the chuck 72 for holding and supporting an object to be treated, e.g., a semiconductor wafer 74. The chuck 72 has an object holder 174, a backing plate 176 supporting the wafer 74, and a retaining ring 178 preventing a wafer from slipping out from the holder during polishing. In the course of polishing, the wafer is pressed towards the backing plate 176 by the applied compression force Fz and towards the retaining ring 178 by the friction force F7, thus having good mechanical contact with both the backing plate and with the retaining ring. Therefore high-frequency acoustic emission sensors can be installed on and mechanically coupled to the retaining ring 178 and the backing plate 176. Also the sensors can be installed on the object holder as long as it has reliable mechanical coupling with the backing plate 176 and the retaining ring 178.

In the embodiment shown in FIG. 18, acoustic signals are measured by a plurality of groups of high-frequency acoustic emission sensors. A first group of high-frequency acoustic emission sensors 180 is installed on the retaining ring 178. A second group of high-frequency acoustic emission sensors 182 is mounted on the backing plate 176, and a third group of high-frequency acoustic emission sensors 184 is embedded into the object holder 174.

In the preferred embodiment of the invention the acoustic emission sensors should have a frequency response bandwidth from 100 kHz up to 10 MHz and constitute piezoelectric plates (not shown) having a thickness from 0.1 mm up to 5 mm. The transducer of the apparatus of invention is also equipped with an acoustic emission transducing unit 186 (FIG. 11) electrically connected to the aforementioned high-frequency acoustic emission sensors 180, 182, 184, and via the connecting device 158 to the data receiving unit 164 of the data processing system 162. Based on received acoustic data signals, the data processing system 162 defines polishing parameters such as an average value, a peak value, and a standard deviation for the acoustic data signal over predetermined period of time, and effectively controls the polishing process.

Other parameters that can be used for effectively controlling the polishing process are temperatures of the wafer, pad, and polishing slurry. Due to the heat generated by friction in the interface between the wafer and the polishing pad, the temperatures of these parts can vary during polishing. Such variations of the temperature corresponding to variations in friction can be used as an additional indication of a transition from one layer to another. Also, intensity of a chemical reaction between the slurry components and the material on the front surface of the wafer, greatly depending on the temperature of reacting parts, can affect both the rate and uniformity of the material removal. Therefore, measuring and controlling the temperature of the slurry, wafer, and pad in close proximity of the interface between the wafer and the pad allow for more effective and reliable controlling of the polishing process.

In view of the above, the apparatus of invention further comprises a temperature sensing device 188 (FIG. 18), e.g., a thermocouple or a resistive temperature detector, mounted on the retaining ring in proximity to the wafer front surface. The temperature sensing device 188 that generates a temperature data signal is electrically connected to a temperature transducing unit 189, which is a part of the transducer assembly 150 (FIG. 11). Polishing parameters may further include an average value, a peak value, and a standard deviation for the temperature data signal over predetermined period of time. These additional parameters may further contribute to efficiency and reliability of the polishing process control.

Figure 19:
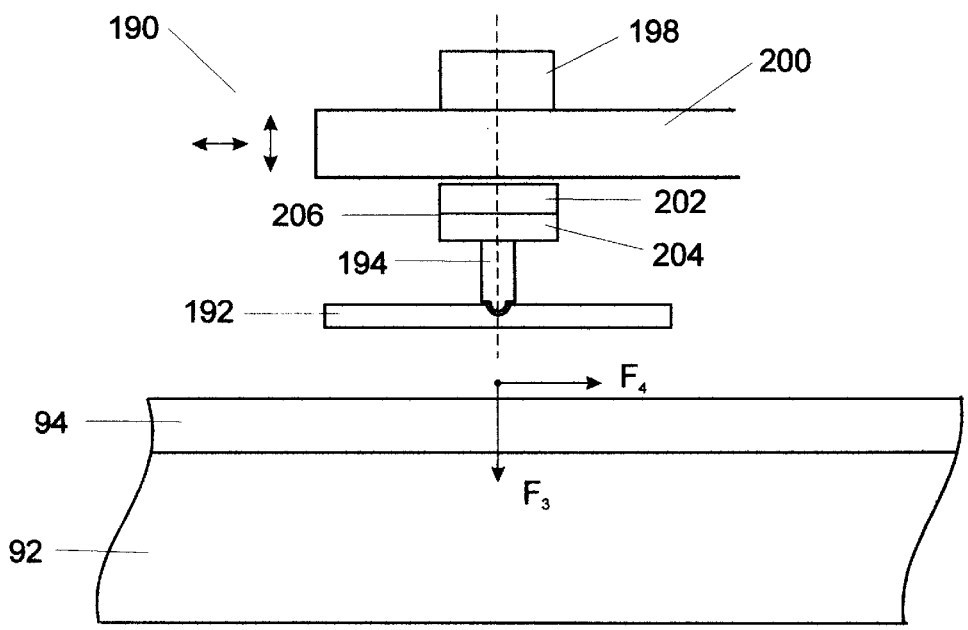
FIG. 19 is a schematic view of a pad conditioner used in the apparatus of invention.

As it was shown above, the efficiency of polishing greatly depends on the pad surface conditions and may decrease with time as the wear of the polishing pad progresses. In polishing this problem is solved by utilizing a pad conditioning mechanism for refreshing the working surface of the pad in the course of polishing or after a period of use. Conditioning provides more stable polishing rate and better uniformity of polishing across a wafer surface. When conditioning is no more effective in deterring the degradation of the polishing pad, the pad requires replacement. Pad conditioning can be done by rubbing an abrasive (usually diamond-containing) tool or stiff brush against the pad surface for removing polishing byproducts and slurry remaining on the pad and for refresh the pad surface. A conditioning device 190 used in the apparatus of the invention as shown in FIG. 19 is mounted on a movable arm 200 and is capable of moving along the pad surface. The conditioning device has a conditioning tool 192, such as an abrasive disk or brush mounted on a conditioner shaft 194, which performs rotational motion. The shaft is connected to a conditioning rotary drive unit 198, which is mounted on the arm 200. The arm 200, in turn, is connected to a drive mechanism (not shown) that can be installed on the base plate 54 and is used for moving the conditioning device with the shaft 194 and the conditioning tool 192 across the pad 94 in a horizontal direction and in a vertical direction for pressing the conditioning tool 192 against the pad 94. The conditioning device 190 is mounted on the arm 200 through a mechanical sensor 202 for sensing a compression force F3, with which the conditioning tool 192 is pressed to the polishing pad 94 in a direction perpendicular to the working surface 96 of the pad, and a mechanical sensor 204 for sensing a force F4 acting between the conditioning tool 192 and the polishing pad 94 in a direction parallel to the working surface 96 of the pad 94, i.e., a friction force.

In the preferred embodiment of the invention the mechanical sensor 202 for sensing the force F3 and the mechanical sensor 204 for sensing the force F4 can be combined into a single bidirectional force sensor 206 which allows for simultaneous detecting the force F3 and the force F4. The sensor of this type has been described with reference to FIG. 12.

In operation, the conditioning tool 192 is pressed against the pad 94, while being rotated and moved along the pad surface 96, so that the polishing byproducts are removed, and the working surface 96 of the pad 94 is refreshed. In response to the relative motion of the conditioning tool along the pad, the sensors 202 and 204 detect a compression force applied from the conditioning tool 192 to the pad 94 and a friction force acting in the direction parallel to the pad surface. The sensors generate conditioning output data signals relating to the compression force and the friction force. A conditioning transducer, electrically connected to the mechanical sensors 202, 204, and 206, amplifies the aforementioned conditioning output data signals. The data processing system 162 (FIG. 10) receives the conditioning output data signals via the connecting device 158 and computes predetermined conditioning parameters, e.g., friction coefficient between the pad and the conditioning tool as a ratio of the friction force to the compression force, thus allowing for detecting surface conditions on the pad. Continuous monitoring of the pad surface conditions allows for timely reconditioning and replacing the pad and provides for uniform and repeatable polishing results.

Thus it has been shown that the invention provides effective, accurate, universal, and reliable method and apparatus for a controlled polishing process such as CMP. The method and apparatus of the invention allow control of CMP processes on the basis of combined direct mechanical, acoustical, and thermal measurements of polishing conditions, provide direct measurement of a friction coefficient in a CMP process under various operation conditions and with the use of different polishing materials. Also, the method and apparatus of the invention provide for a CMP process with controlled conditioning of the polishing pad surface.

The invention has been shown and described with reference to specific embodiments which should be construed only as examples and do not limit the scope of practical applications of the invention. Therefore any changes and modifications in materials, shapes, electric diagrams and their components are possible provided these changes and modifications do not depart from the scope of the patent claims. For example the polishing drive mechanism can be of a rotary type, an orbital type, or a linear type. The polishing pad itself can be made in the form of a disk, an endless belt or a web. The aforementioned force and torque sensors can be substituted with a single multi-axes sensor capable of simultaneously measuring a compression force, a friction force, and a friction torque. The mechanical sensors measuring compression and friction forces between the conditioning tool and the pad can be supplemented with a torque sensor detecting a friction torque on the conditioning tool. The vertical drive mechanism and the horizontal drive mechanism can be based on an electric motor, pneumatic or hydraulic actuator in combination with various movement conversion mechanisms, such as a lead screw with a drive nut, gears, etc.

What is claimed is:

1. An apparatus for controlled polishing an object having a surface to be polished in a polishing process, comprising:
   a frame which has a base plate and at least one vertical column;
   a vertical positioning means mounted on said at least one vertical column;
   a first drive means for moving said vertical positioning means along said at least one vertical column with respect to said base plate;
   a horizontal positioning means being capable of performing motions in a direction parallel to said base plate;
   a second drive means for moving said horizontal positioning means in said direction parallel to said base plate;

a head having means for supporting an object to be treated, said head being capable of performing vertical, horizontal and rotary motions and having an axis of rotation, said object having a front surface to be polished;

a third drive means for rotating said head in respect to said axis;

a polishing module which is attachable to said base plate, has a platen with a polishing pad removably attached to the top of said platen and a polishing drive means for moving said platen with respect to said object, while maintaining them in contact, said polishing pad having a working surface opposed to said platen, said working surface being in parallel to said front surface of said object, said platen having a center;

sensing means for simultaneous combined sensing of changes that occur on said front surface of said object being polished during said polishing and for generating output data signals, said sensing means comprising:

compression sensing means for generating compression data signals corresponding to a force with which said object is pressed during polishing to said polishing pad;

friction sensing means for generating friction data signals corresponding to a friction force that occurs during polishing between said polishing pad and said object; and transducing means for acquiring, amplifying and conditioning said compression data signals obtained from said compression sensing means and said friction data signals obtained from said friction sensing means, said transducing means having a compression measurement unit and a friction measurement unit;

control means for combined processing said data signals and for combined controlling of said polishing process, comprising a processing unit and a display unit; and connecting means for connecting said transducing means to said control means.

2. The apparatus of claim 1, wherein said polishing drive means comprises a drive motor and a transmission unit between said drive motor and said platen.

3. The apparatus of claim 2, wherein said transmission unit is selected from a rotary type transmission unit which imparts rotary motions to said platen and an orbital type transmission unit which imparts orbital motions to said platen.

4. The apparatus of claim 3, wherein said compression sensing means comprises a first force sensor detecting a first force acting in a first direction perpendicular to said working surface of said pad and to said front surface of said object; said friction sensing means being selected from a second force sensor detecting a second force acting in a second direction parallel to said working surface of said pad and to said front surface of said object and a torque sensor detecting a torque acting in respect to an axis parallel to said first direction.

5. The apparatus of claim 4, wherein said processing unit is electrically connected to said transducing means through said connecting means, said processing unit having a receiving means for receiving said compression data signals and said friction data signals, a recording means for recording and storing said compression data signals and said friction data signals, a computing means for computing predetermined polishing parameters in response to said compression data signals and said friction data signals, an analyzing means for retrieving and analyzing said compression data signals and said friction data signals and for optimizing said polishing parameters to achieve a predefined optimization criteria, and a control means for controlling said first drive means, said second drive means, said third drive means, and said polishing drive means in response to said predetermined polishing parameters; said display unit having means for real-time and off-line monitoring said compression data signals, said friction data signals, and said polishing parameters.

6. The apparatus of claim 5, wherein said predetermined polishing parameters comprise a friction coefficient defined as a ratio of said second force to said first force, a polishing time, an average value, a peak value, and a standard deviation computed over predetermined period of time for said first force, an average value, a peak value, and a standard deviation computed over predetermined period of time for said second force, an average value, a peak value, and a standard deviation computed over predetermined period of time for said torque, an average value, a peak value, and a standard deviation computed over predetermined period of time for said friction coefficient.

7. The apparatus of claim 6, wherein said sensing means for combined sensing of changes that occur on said front surface of said object being polished during said polishing process further comprise high-frequency acoustic sensing means generating acoustic data signals; said predetermined polishing parameters further comprise an average value, a peak value, and a standard deviation computed over predetermined period of time for said acoustic data signals.

8. The apparatus of claim 7, wherein said head comprising a retaining ring, a backing plate, and an object holder, and said high-frequency acoustic sensing means comprising plurality of groups of high-frequency acoustic emission sensors selected from a first group of high-frequency acoustic emission sensors installed on said retaining ring, a second group of high-frequency acoustic emission sensors mounted on said backing plate, and a third group of high-frequency acoustic emission sensors embedded into said object holder.

9. The apparatus of claim 8, wherein said groups of high-frequency acoustic emission sensors comprising acoustic emission sensors with a frequency response bandwidth from 100 kHz to 10 MHz, having piezoelectric plates with a thickness from 0.1 mm to 5 mm and electrically connected to said transducing means, said transducing means further comprising an acoustic emission transducing unit.

10. The apparatus of claim 5, wherein said processing unit is electrically connected to said first drive means and has means for setting, maintaining, and controlling said first force acting in a first direction in response to said compression data signals.

11. The apparatus of claim 5, wherein said sensing means for combined sensing of changes that occur between said front surface of said object being polished and said working surface of said polishing pad during said polishing process further comprise a temperature sensing means mounted on said retaining ring, generating a temperature data signal, and electrically connected to said transducing means; said transducing means further comprising a temperature transducing unit; said polishing parameters further comprising an average value, a peak value and a standard deviation computed over predetermined period of time for said temperature data signal.

12. The apparatus of claim 4, wherein said compression sensing means and said friction sensing means are combined into a single bidirectional force sensor detecting said first force acting in a first direction and said second force acting in a second direction.

13. The apparatus of claim 12, wherein said single bidirectional force sensor comprises a device for measuring a first force acting in one direction and a second force acting in a direction which is different from said one direction and is not parallel thereto, said device comprising:
- a first mounting member;
- a second mounting member;
- a first flexible member, one end of which is attached to said first mounting member and the opposite end is attached to said second mounting member;
- a second flexible member, which is identical to said first flexible member, is arranged parallel thereto and has one end, which corresponds to said one end of said first flexible member, attached to said second mounting member, and the opposite end, which corresponds to said opposite end of said first flexible member, attached to said first mounting member; and
- deformation sensitive means for measuring deformations of said first flexible member and of said second flexible member in terms of said first force and said second force respectively, said first flexible member and said second flexible member being deformed simultaneously by equal amounts and in mutually opposite directions.

14. The apparatus of claim 13, wherein said first mounting member is a first plate, said second mounting member is a second plate, said first flexible member and said second flexible member comprising deformable beams sandwiched between said first plate and said second plate.

15. The apparatus of claim 13, wherein each of said deformation sensitive means comprises a strain gauge.

16. The apparatus of claim 13, wherein said first mounting member of said bidirectional force sensor mounted to said means for supporting said *object to be treated and said second mounting member of said bidirectional force sensor mounted to said head.

17. The apparatus of claim 13, wherein said first mounting member of said bidirectional force sensor mounted to said head and said second mounting member of said bidirectional force sensor mounted to said horizontal positioning means.

18. The apparatus of claim 13, wherein said first mounting member of said bidirectional force sensor mounted to said platen and said second mounting member of said bidirectional force sensor mounted to said transmission unit.

19. The apparatus of claim 13, wherein said first mounting member of said bidirectional force sensor mounted to said transmission unit and said second mounting member of said bidirectional force sensor mounted to said base plate.

20. The apparatus of claim 4, wherein each of said first force sensor, said second force sensor, and said torque sensor comprises:
- a third mounting member;
- a fourth mounting member;
- at least one flexible member having two ends and at least one deformable portion, one end of said flexible member being attached to said first mounting member, the opposite end of said flexible member being attached to said second mounting member; and
- deformation sensitive means for detecting deformations of said deformable portion of said flexible member in terms of said first force, said second force, and said torque respectively.

21. The apparatus of claim 20, wherein each of said deformation sensitive means comprises a strain gauge.

22. The apparatus of claim 20, wherein said third mounting member of said first force sensor is fixed to said means for supporting said object to be treated and said fourth mounting member of said first force sensor is fixed to said head.

23. The apparatus of claim 20, wherein said third mounting member of said first force sensor mounted to said head and said fourth mounting member of said first force sensor mounted to said horizontal positioning means.

24. The apparatus of claim 20, wherein said third mounting member of said first force sensor mounted to said platen and said fourth mounting member of said first force sensor mounted to said transmission unit.

25. The apparatus of claim 20, wherein said third mounting member of said first force sensor mounted to said transmission unit and said fourth mounting member of said first force sensor mounted to said base plate.

26. The apparatus of claim 20, wherein said third mounting member of said torque sensor mounted to said means for supporting said object to be treated and said fourth mounting member of said torque sensor mounted to said head.

27. The apparatus of claim 20, wherein said third mounting member of said torque sensor mounted to said head and said fourth mounting member of said torque sensor mounted to said horizontal positioning means.

28. The apparatus of claim 20, wherein said third mounting member of said torque sensor mounted to said platen and said fourth mounting member of said torque sensor mounted to said transmission unit.

29. The apparatus of claim 20, wherein said third mounting member of said torque sensor mounted to said transmission unit and said fourth mounting member of said torque sensor mounted to said base plate.

30. The apparatus of claim 20, wherein said third mounting member of said second force sensor mounted to said means for supporting said object to be treated and said fourth mounting member of said second force sensor mounted to said head.

31. The apparatus of claim 20, wherein said third mounting member of said second force sensor mounted to said head and said fourth mounting member of said second force sensor mounted to said horizontal positioning means.

32. The apparatus of claim 20, wherein said third mounting member of said second force sensor mounted to said platen and said fourth mounting member of said second force sensor mounted to said transmission unit.

33. The apparatus of claim 20, wherein said third mounting member of said second force sensor mounted to said transmission unit and said fourth mounting member of said second force sensor mounted to said base plate.

34. The apparatus of claim 3, further comprising a slurry supplying means for supplying a polishing slurry onto said working surface of said pad while said front surface of said object being polished.

35. The apparatus of claim 3, further comprising a conditioning means for conditioning said working surface of said pad, said conditioning means being brought in contact with said working surface to remove polishing byproducts remaining on said working surface and to refresh said working surface.

36. The apparatus of claim 35, wherein said conditioning means is selected from brushing means and abrasive means.

37. The apparatus of claim 35, further comprising mechanical sensing means for combined sensing of a third force acting between said conditioning means and said polishing pad in a third direction perpendicular to said working surface of said pad, and a fourth force acting between said conditioning means and said polishing pad in a fourth direction parallel to said working surface of said pad, said mechanical sensing means comprising a third force sensor generating a third force data signal and a fourth force sensor generating a fourth force data signal, said mechanical sensing means being electrically connected to said transducing means; said transducing means further comprising a conditioning transducing unit for receiving, amplifying and conditioning said third force data signal and said fourth force data signal; said predetermined polishing parameters further comprising a conditioning friction coefficient defined as a ratio of said fourth force to said third force, an average value, a peak value, and a standard deviation computed over predetermined period of time for said third force, an average value, a peak value, and a standard deviation computed over predetermined period of time for said fourth force, and an average value, a peak value, and a standard deviation computed over predetermined period of time for said conditioning friction coefficient.

38. The apparatus of claim 37, wherein said mechanical sensing means comprises a combined single bidirectional force sensor detecting said third force acting in said third direction and a said fourth force acting in said fourth direction.

39. The apparatus of claim 3, comprising a first position detecting means for detecting position of said head in respect to said platen, said first position detecting means generating vertical position data signal, being mechanically coupled with said first drive means and electrically connected to said processing unit.

40. The apparatus of claim 3, comprising a second position detecting means for detecting position of said axis of said head in respect to a center of said platen, said second position detecting means generating lateral position data signal, being mechanically coupled with said second drive means and electrically connected to said processing unit.

41. A method for controlling a process of polishing an object having a front surface to be polished, said method comprising the steps of:
   providing a polishing apparatus comprising a frame with a base plate, a head having means for supporting an object to be treated, said head being capable of performing rotary motions and having an axis of rotation, said object having a front surface to be polished, a polishing module which is attachable to said base plate and has a platen with a replaceable resilient pad having working surface, a sensing means for combined sensing of changes that occur between said front surface of said object being polished and said working surface of said resilient pad during said process of polishing, said sensing means generating output data signals and comprising a compression sensing means and a friction sensing means, a transducing means having a compression measurement unit and a friction measurement unit, a control means having a processing unit and a display unit and a connecting means;
   bringing said front surface of said object in contact with said working surface of said pad;
   polishing said object in said process of polishing by means of said apparatus;
   sensing changes on said front surface of said object being polished during said process of polishing simultaneously by means of said compression sensing means and said friction sensing means;
   measuring and combined processing said data signals obtained from said compression sensing means and friction sensing means;
   computing predetermined parameters of said process of polishing based on said data signals by means of said processing unit;
   comparing said predetermined parameters obtained in said step of computing with predefined optimized parameters of said process of polishing; and
   controlling said process of polishing in response to said steps of measuring and combined processing, computing, and comparing.

42. The method of claim 41, further comprising the step of setting, maintaining and controlling said first drive means in response to said compression data signal.

43. The method of claim 41, wherein said sensing means for combined sensing of changes that occur on said front surface of said object being polished during said process of polishing further comprising high-frequency acoustic sensing means generating acoustic data signals; said method further comprising the steps of:
   arranging said high-frequency acoustic sensing means in said head;
   measuring said acoustic data signals by means of said transducing means comprising an acoustic emission measuring unit;
   combined processing said acoustic data signals by means of said processing unit;
   controlling said process of polishing in response to said steps of measuring and combined processing said acoustic data signals.

44. The method of claim 41, wherein said sensing means for combined sensing of changes that occur on said front surface of said object being polished during said polishing further comprise temperature sensing means generating temperature data signals; said method comprising the steps of:
   arranging said temperature sensing means in a plurality of locations selected from said head, said means for supporting an object to be treated, said pad, and said slurry supplying means;
   measuring said temperature data signals by means of said transducing means comprising a temperature measuring unit;
   combined processing said temperature data signals by means of said processing unit;
   controlling said process of polishing in response to said step of measuring and combined processing said temperature data signals.

45. The method of claim 41, wherein said polishing apparatus further comprising a conditioning means selected from a brushing means and an abrasive means for conditioning said working surface of said pad and a mechanical sensing means generating mechanical data signals for combined sensing of a third force acting between said conditioning means and said polishing pad in third direction perpendicular to said working surface of said pad, and a fourth force acting between said conditioning means and said polishing pad in fourth direction parallel to said working surface of said pad, said method comprising the steps of:
   bringing said conditioning means in contact with said working surface to remove polishing byproducts remaining on said working surface therefrom and to refresh said working surface;
   measuring said mechanical data signals by means of said transducing means comprising a mechanical measuring unit;
   combined processing said mechanical data signals by means of said processing unit; and
   controlling said conditioning in response to said steps of measuring and combined processing said mechanical data signals.

* * * * *